(12) United States Patent
Nagashima

(10) Patent No.: US 8,169,648 B2
(45) Date of Patent: May 1, 2012

(54) DRIVER MANAGEMENT APPARATUS AND METHOD THEREFOR

(75) Inventor: Takeyuki Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 764 days.

(21) Appl. No.: 12/332,271

(22) Filed: Dec. 10, 2008

(65) Prior Publication Data

US 2009/0147309 A1 Jun. 11, 2009

(30) Foreign Application Priority Data

Dec. 11, 2007 (JP) ................................. 2007-319838

(51) Int. Cl.
*G06F 3/12* (2006.01)
*G06K 15/00* (2006.01)
(52) U.S. Cl. ...................................... 358/1.15; 358/1.13
(58) Field of Classification Search ........................ None
See application file for complete search history.

(56) References Cited

U.S. PATENT DOCUMENTS

| 6,623,190 | B1 * | 9/2003 | Lutz ............................... 400/76 |
| 7,443,523 | B2 * | 10/2008 | Leone et al. .................. 358/1.15 |
| 2003/0133151 | A1 * | 7/2003 | Tamai et al. .................. 358/1.15 |
| 2004/0003112 | A1 | 1/2004 | Alles |
| 2004/0184074 | A2 * | 9/2004 | Leiman et al. ............... 358/1.15 |
| 2008/0263071 | A1 * | 10/2008 | Ferlitsch et al. .............. 707/101 |

FOREIGN PATENT DOCUMENTS

| JP | 2004-38956 | 2/2004 |
| JP | 2007-66091 | 3/2007 |
| WO | 2007026908 | 3/2007 |

* cited by examiner

*Primary Examiner* — Gabriel Garcia
(74) *Attorney, Agent, or Firm* — Canon USA, Inc., I.P. Division

(57) ABSTRACT

A driver management apparatus includes a receiving unit configured to receive a network entry message sent by unicast according to a search protocol for one-to-one connection from a device connected to a network, a determination unit configured to determine an operation environment in which the device executes a job sent from a client apparatus connected to the network, and an installation unit configured to install a driver for operating the device that has sent the network entry message according to the operation environment determined by the determination unit.

17 Claims, 26 Drawing Sheets

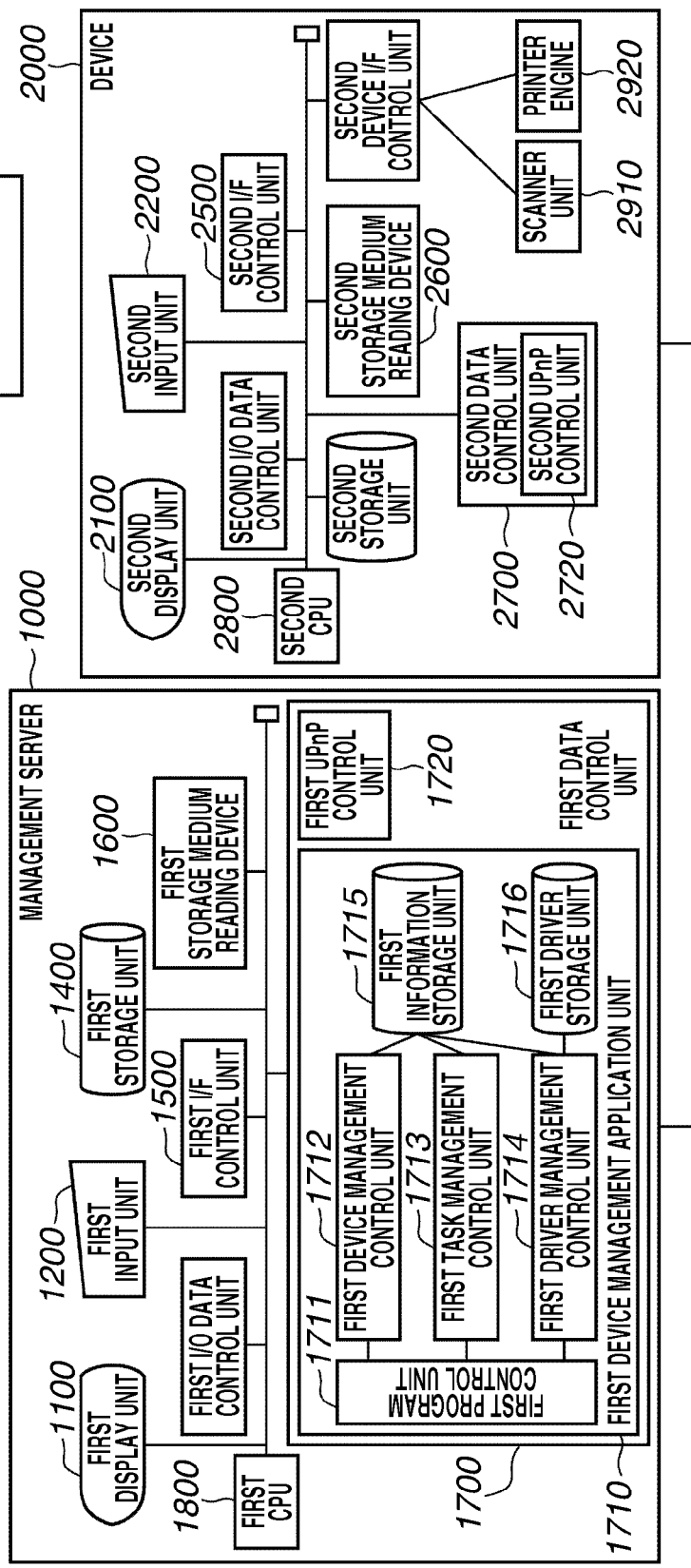

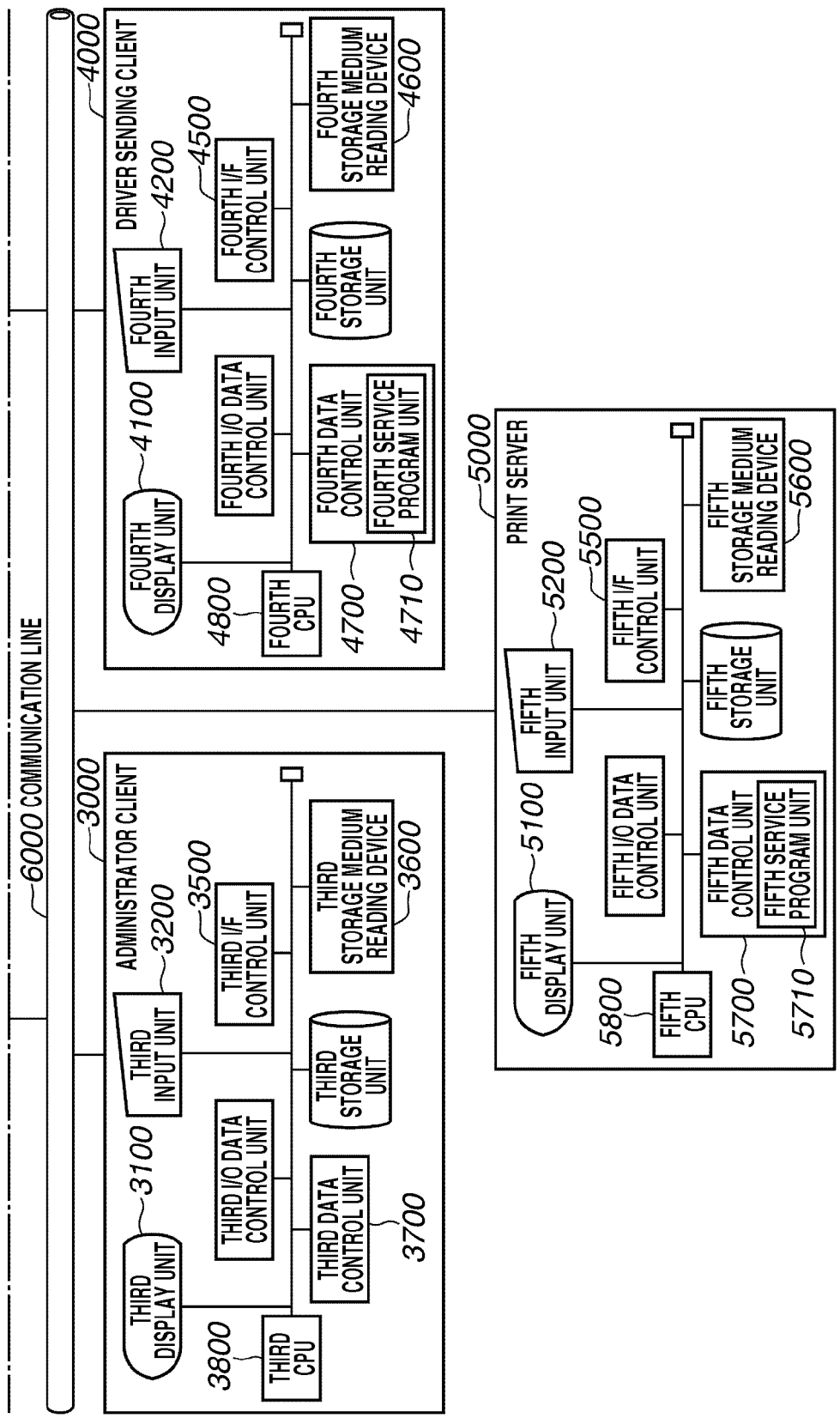

| CLIENT ID | OS NAME | ..... | IP ADDRESS | RELATIONSHIP BETWEEN GROUPS |
|---|---|---|---|---|
| CLIENT00 | A/B/C | ..... | aaa.bbb.ccc.100 | GROUP 1 > SUBGROUP 1 |
| CLIENT01 | A/B/C | ..... | aaa.bbb.ccc.002 | GROUP 1 > SUBGROUP 2 |
| CLIENT02 | A/B/C | ..... | aaa.bbb.ccc.101 | GROUP 1 > SUBGROUP 1 |
| CLIENT03 | A/B/C | ..... | aaa.bbb.ccc.004 | GROUP 1 > SUBGROUP 2 |
| ... | ... | ... | ... | ... |

| DEVICE ATTRIBUTE ID | IP ADDRESS ID | COLOR PRINTING | ... | PRINTING SPEED ID | FINISHING ID |
|---|---|---|---|---|---|
| SelectedDevAttr-1 | IPID-1 | ON | ... | PVID-1 | OFF |
| SelectedDevAttr-2 | OFF | ON | ... | OFF | FinID-1 |
| ... | ... | ... | ... | ... | ... |

| IP ADDRESS ID | IP ADDRESS ATTRIBUTE |
|---|---|
| IPID-1 | aaa.bbb.ccc.100 ~ aaa.bbb.ccc.110 |
| ⋮ | ⋮ |

| PRINTING SPPED ID | PRINTING SPPED ATTRIBUTE | CONDITION ATTRIBUTE |
|---|---|---|
| PVID-1 | 40 | ppm OR HIGHER |
| ⋮ | ⋮ | ⋮ |

| FINISHING ID | FINISHING ATTRIBUTE |
|---|---|
| FinID-1 | BOOKBINDING FUNCTION |
| ⋮ | ⋮ |

| SELECTED CLIENT ID | SELECTED CLIENT |
|---|---|
| SelectedClients-1 | CLIENT00, CLIENT02 |
| SelectedClients-2 | CLIENT00, CLIENT03 |
| ⋮ | ⋮ |

| DEVIDE ATTRIBUTE ID | SELECTED CLIENT ID |
|---|---|
| SelectedDevAttr-1 | SelectedClients-1 |
| SelectedDevAttr-2 | SelectedClients-2 |
| ⋮ | ⋮ |

| |
|---|
| OPERATION ENVIRONMENT MODE |
| PUSH (AGENT-AVAILABLE) MODE |

| DEVICE NUMBER | MAC ADDRESS | UPnPID | ... | IP ADDRESS | COLOR PRINTING | PRINTING SPEED | FINISHING FUNCTION |
|---|---|---|---|---|---|---|---|
| Dev-1 | AA-BB-CC-DD-EE-01 | UPnP_4E0F | ...... | aaa.bbb.ccc.101 | COLOR | 40 | NONE |
| ... | ... | ... | ... | ... | ... | ... | ... |

| DRIVER ID | UPnPID |
|-----------|--------|
| DRIVER00  | UPnP_4E0F |
| DRIVER01  | UPnP_5FFF |
| ⋮ | ⋮ |

| ASSOCIATION ID | DEVICE NUMBER | DRIVER ID |
|----------------|---------------|-----------|
| Connect-01 | Dev-1 | DRIVER00 |
| ⋮ | ⋮ | ⋮ |

| SELECTED CLIENT ID | OPERATION ENVIRONMENT MODE |
|---|---|
| SelectedClients-1 | PUSH (AGENT-AVAILABLE) MODE |
| SelectedClients-2 | PRINT SERVER MODE |
| ⋮ | ⋮ |

DRIVER MANAGEMENT APPARATUS AND METHOD THEREFOR

BACKGROUND OF THE INVENTION

1. Field of the Invention

The present invention relates to a driver management apparatus and a method for driver management. More specifically, the present invention relates to a method for managing a device driver.

2. Description of the Related Art

In a conventional method, a device-client environment in which a device, such as a printer, and a client terminal apparatus (hereinafter simply referred to as a "client" where necessary) are in communication with each other via a network, a driver compliant with the device is installed on the client.

More specifically, in the conventional method, when the device connected to the network sends a network entry message to the network, the client on the network installs a driver for the device in response to the network entry message.

Furthermore, the client installs the driver according to a reply from the device to a network entry message sent to the network upon connecting to the network. The conventional method like this is implemented, for example, by Universal Plug and Play (UPnP™) protocol of Microsoft® Corporation, Web Services for Devices (WSD), or the Rendezvous function of Apple® Inc. (see Japanese Patent Application Laid-Open No. 2004-38956).

Furthermore, Japanese Patent Application Laid-Open No. 2007-66091 discusses a method for preventing installation of a driver unnecessary to a user on a client. In the conventional method discussed in Japanese Patent Application Laid-Open No. 2007-66091, a client includes a module for controlling a setting related to whether to accept UPnP. Furthermore, the client determines whether to install the driver for the device connected to the network according to the setting.

SUMMARY OF THE INVENTION

The present invention is directed to a method adapted to appropriately manage a device driver to be installed on a client terminal apparatus or a print server connected to a network.

According to an aspect of the present invention, a driver management apparatus includes a receiving unit configured to receive a network entry message sent by unicast according to a search protocol for one-to-one connection from a device connected to a network, a determination unit configured to determine an operation environment in which the device executes a job sent from a client apparatus connected to the network, and an installation unit configured to install a driver for operating the device that has sent the network entry message. In the driver management apparatus, if the operation environment determined by the determination unit is an environment in which the client apparatus directly instructs the device to execute the job, the installation unit is configured to install the driver to enable the client apparatus to directly instruct the device to execute the job, and if the operation environment determined by the determination unit is an environment in which the client apparatus instructs the device via a print server connected to the device to execute the job, the installation unit is configured to install the driver to enable the client apparatus to instruct the device via the print server to execute the job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 1, composed of FIGS. 1A and 1B, illustrates an example of a configuration of a printing system according to a first exemplary embodiment of the present invention.

FIG. 8 illustrates an example of a table related to the driver sending client, which is previously stored in a first information storage unit according to the first exemplary embodiment.

FIG. 10 illustrates an example of a first table for storing the content of a setting performed by a user of the printing system via the UI screen illustrated in FIG. 6 according to the first exemplary embodiment of the present invention.

FIG. 11 illustrates an example of a second table for storing the content of a setting performed by a user of the printing system via the UI screen illustrated in FIG. 6 according to the first exemplary embodiment of the present invention.

FIG. 12 illustrates an example of a third table for storing the content of a setting performed by a user of the printing system via the UI screen illustrated in FIG. 6 according to the first exemplary embodiment of the present invention.

FIG. 13 illustrates an example of a fourth table for storing the content of a setting performed by a user of the printing system via the UI screen illustrated in FIG. 6 according to the first exemplary embodiment of the present invention.

FIG. 14 illustrates an example of a table for storing the content of a setting performed by a user of the printing system via the UI screen illustrated in FIG. 7 according to the first exemplary embodiment of the present invention.

FIG. 15 illustrates an example of a table for storing a device attribute and a driver sending client associated with each other according to the first exemplary embodiment of the present invention.

FIG. 21 illustrates an example of a table for storing information about the operation environment mode according to the first exemplary embodiment of the present invention.

FIG. 23 illustrates an example of a table for storing device attribute information according to the first exemplary embodiment of the present invention.

FIG. 24 illustrates an example of a table for storing driver information according to the first exemplary embodiment of the present invention.

FIG. 25 illustrates an example of a table for storing a device and a driver associated with each other according to the first exemplary embodiment of the present invention.

FIG. 27 illustrates an example of a table for storing information about the operation environment mode according to the second exemplary embodiment of the present invention.

DETAILED DESCRIPTION OF THE EMBODIMENTS

Figure 2A:
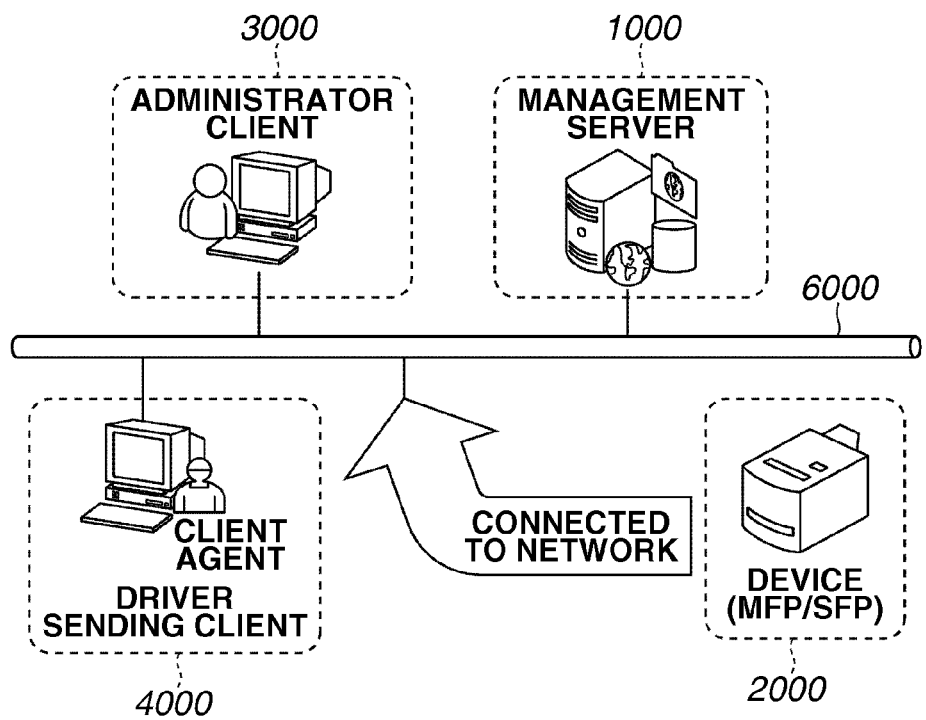
FIGS. 2A and 2B each illustrates an example of an operation performed by the printing system in an operation environment (PUSH mode) in which a print server according to the first exemplary embodiment is not used.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

FIG. 1, composed of FIGS. 1A and 1B, illustrates an example of a configuration of a printing system according to a first exemplary embodiment of the present invention.

Referring to FIG. 1, the printing system includes a management server 1000, a device 2000, an administrator client 3000, a driver sending client 4000, and a print server 5000. Here, the management server 1000 is an example of a driver management apparatus while the driver sending client 4000 is an example of a client terminal apparatus. The management server 1000, the device 2000, the administrator client 3000, the driver sending client 4000, and the print server 5000 are in communication with one another via a communication line 6000.

Furthermore, the management server 1000, the device 2000, the administrator client 3000, the driver sending client 4000, and the print server 5000 include CPUs 1800, 2800, 3800, 4800, and 5800, respectively. The CPUs 1800, 2800, 3800, 4800, and 5800 each execute a program using related data, for example.

The program and the related data are stored on a storage medium such as a floppy disk (FD), a compact disc-read only memory (CD-ROM), or an integrated circuit (IC) memory card. The program and the related data are read by storage medium reading devices 1600, 2600, 3600, 4600, and 5600 of the management server 1000, the device 2000, the administrator client 3000, the driver sending client 4000, and the print server 5000, respectively.

Furthermore, the CPUs 1800, 2800, 3800, 4800, and 5800 each load a system program and an application program from the storage medium reading devices 1600, 2600, 3600, 4600, and 5600 to data control units 1700, 2700, 3700, 4700, and 5700.

The system program and the application program are used for performing processing on information entered via display units 1100, 2100, 3100, 4100, and 5100 or input units 1200, 2200, 3200, 4200, and 5200. The system program and the application program are used for inputting and outputting data via interface (I/F) control units 1500, 2500, 3500, 4500, and 5500.

The display units 1100, 2100, 3100, 4100, and 5100 each include a display device, such as a cathode ray tube (CRT) display or a liquid crystal display (LCD). Furthermore, the input units 1200, 2200, 3200, 4200, and 5200 each are constituted by a pointing device, such as a mouse, and an input device, such as a keyboard.

Furthermore, each of the storage medium reading devices 1600, 2600, 3600, 4600, and 5600 can include a hard disk or a magneto-optical disk. Here, it is also useful if each of the storage medium reading devices 1600, 2600, 3600, 4600, and 5600 includes a combination of a hard disk and a magneto-optical disk.

The device 2000 includes a scanner unit 2910 and a printer engine 2920, which is a printing unit. That is, the device 2000 is, for example, a multifunction printing apparatus. For example, the device 2000 performs a print job sent from the driver sending client 4000 with the printer engine 2920.

Note here that the print job can be either directly input from the driver sending client 4000 or indirectly input from the driver sending client 4000 via the management server 1000.

In addition, the device 2000 stores device information, such as Management Information Base (MIB). The acquisition and setting of the device information can be mainly implemented by a user operation on the administrator client 3000 via the communication line 6000.

The management server 1000 includes a UPnP control unit 1720, while the device 2000 includes a UPnP control unit 2720. The UPnP control units 1720 and 2720 each include a function for controlling the UPnP function. The UPnP control unit 1720 and the UPnP control unit 2720 are associated with an operating system (OS).

In the present exemplary embodiment, the UPnP control unit 2720 of the device 2000 issues (sends) a network entry message to the management server 1000 when the device 2000 is connected to the communication line 6000.

At this time, the second UPnP control unit 2720 sends the network entry message to the management server 1000 by unicast, instead of using multicast, according to the UPnP protocol. Here, the UPnP protocol is an example of a search protocol for one-to-one connection in the present exemplary embodiment. The network entry message is detected by the first UPnP control unit 1720 of the management server 1000.

On the other hand, the driver sending client 4000 can perform printing by using an application via a printer driver. In addition, the driver sending client 4000 can acquire data scanned by the device 2000 via a scanner driver.

In the following description, the printer driver and the scanner driver are collectively and simply referred to as a "driver" where necessary. Furthermore, the communication line 6000 includes a common local area network (LAN) or an interactive serial interface, such as Institute of Electrical and Electronic Engineers (IEEE) 1394 or universal serial bus (USB).

In the present exemplary embodiment, a first device management application unit 1710 of the management server 1000, a fourth service program unit 4710 of the driver sending client 4000, and a fifth service program unit 5710 of the print server 5000 each perform characteristic processing according to an exemplary embodiment of the present invention.

The first device management application unit 1710 includes a first program control unit 1711, a first device management control unit 1712, a first task management control unit 1713, a first driver management control unit 1714, a first information storage unit 1715, and a first driver storage unit 1716.

The first program control unit 1711 is a framework program unit for controlling each control unit, such as the first device management control unit 1712, the first task management control unit 1713, and the first driver management control unit 1714.

The first device management control unit 1712 performs processing for searching for the device 2000, processing for monitoring a status of the device 2000, and processing for changing the setting for the device 2000 via the first task management control unit 1713 with respect to each task. Furthermore, the first device management control unit 1712 performs a communication with the device 2000 via the first UPnP control unit 1720 and acquires device metadata when the UPnP control unit 1720 receives information indicating that the device 2000 having the UPnP function has been extracted as a result of the processing for searching for the device 2000.

As described above, the device 2000 includes the UPnP function. Therefore, in the following description, the device 2000 is also referred to as the "UPnP device 2000" where necessary.

Here, the device metadata includes data indicating an attribute of the device 2000 and data related to the driver for the device 2000. The data indicating the device attribute includes a device type and a device function. The device type indicates a type of the device 2000 (whether the device 2000 is a printing apparatus, a scanner, or a facsimile apparatus). The device function indicates the function of the device 2000.

For example, in the case where the device type is a printing apparatus and the printing apparatus includes a function other than the print function (for example, a facsimile transmission function), the device function includes the print function and the facsimile transmission function. Furthermore, for example, the print function can include information about what type of page description language is used, information about the printing speed, and information about what type of finishing function is included in the device 2000.

On the other hand, the data related to the driver includes driver location information and information about a function for downloading the driver itself.

Meanwhile, as represented by WSD utilized in UPnP, information described in Extensible Markup Language (XML) can be sent and received by utilizing a web service. Accordingly, the device metadata to be sent and received in the above-described manner can be freely selected.

The first driver management control unit 1714 performs sending processing for sending a client agent to the driver sending client 4000. In addition, the first driver management control unit 1714 performs sending processing for sending a print server agent to the print server 5000.

Furthermore, the first driver management control unit 1714 performs a communication using the web service with the client agent and the print server agent sent as described above. In addition, the first driver management control unit 1714 sends the driver and issues an instruction for installing the driver. Note that the above-described processing performed by the first driver management control unit 1714 is performed via the first task management control unit 1713.

The first task management control unit 1713 controls the processing by the first device management control unit 1712 and the first driver management control unit 1714 with respect to each task as described above. To control the processing with respect to each task refers to scheduling and displaying a result of processing according to performance information described and instructed in a task.

Suppose here, for example, that the first driver management control unit 1714 has generated a driver task for sending a driver to a driver sending client 4000 and the driver task has been sent to the first task management control unit 1713.

In this case, when it comes to a timing for performing the instructed processing, the first task management control unit 1713 instructs the first driver management control unit 1714 to perform the task according to the driver task performance information.

Then, the first driver management control unit 1714 performs the driver task and sends a result of performing the driver task to the first task management control unit 1713. After receiving the result of performing the driver task, the first task management control unit 1713 performs processing for displaying the result of performing the driver task.

Here, in the present exemplary embodiment, the first device management application unit 1710 is a web application. Furthermore, the user performs an operation for the first device management application unit 1710 via a third display unit 3100 and a third input unit 3200 of the administrator client 3000 via a web browser as an interface between them.

Note here that it is also useful if the first device management application unit 1710 uses a normal native application rather than using the web application. In this case, an administrator of the printing system performs an operation for the first device management application unit 1710 via the first display unit 1100 and the first input unit 1200 of the management server 1000, not via the administrator client 3000.

The first driver management control unit 1714 performs processing for establishing a communication with the fourth service program unit 4710, which is included in the fourth data control unit 4700 of the driver sending client 4000. Here, the fourth service program unit 4710 is a service program having a driver installation function. In the following description, the service program is also referred to as a "client agent" where necessary.

Furthermore, the first driver management control unit 1714 performs processing for performing a communication with the fifth service program unit 5710, which is included in the fifth data control unit 5700 of the print server 5000. Here, the fifth service program unit 5710 is a service program having the driver installation function. In the following description, the service program is also referred to as a "print server agent" where necessary.

The client agent and the print server agent perform a communication with the first driver management control unit 1714 by the web service by utilizing a protocol, such as Simple Object Access Protocol (SOAP). Furthermore, the client agent and the print server agent each have a function for acquiring the driver stored in the first driver storage unit 1716 and installing the acquired driver.

In the present exemplary embodiment, the first information storage unit 1715 is a database. The first driver storage unit 1716 is a server that downloads a driver, such as a file transfer protocol (FTP) server, a hypertext transport protocol (HTTP) server, or a file server. Here, the first information storage unit 1715 and the first driver storage unit 1716 can be provided in the management server 1000 as illustrated in FIG. 1.

Note here that it is also useful if at least one of the first information storage unit 1715 and the first driver storage unit 1716 is provided in a server different from the management server 1000.

The first information storage unit 1715 and the first driver storage unit 1716 receive an access by the first program control unit 1711, the first device management control unit 1712, the first task management control unit 1713, and the first driver management control unit 1714 are utilized for storing necessary data.

Figure 2B:
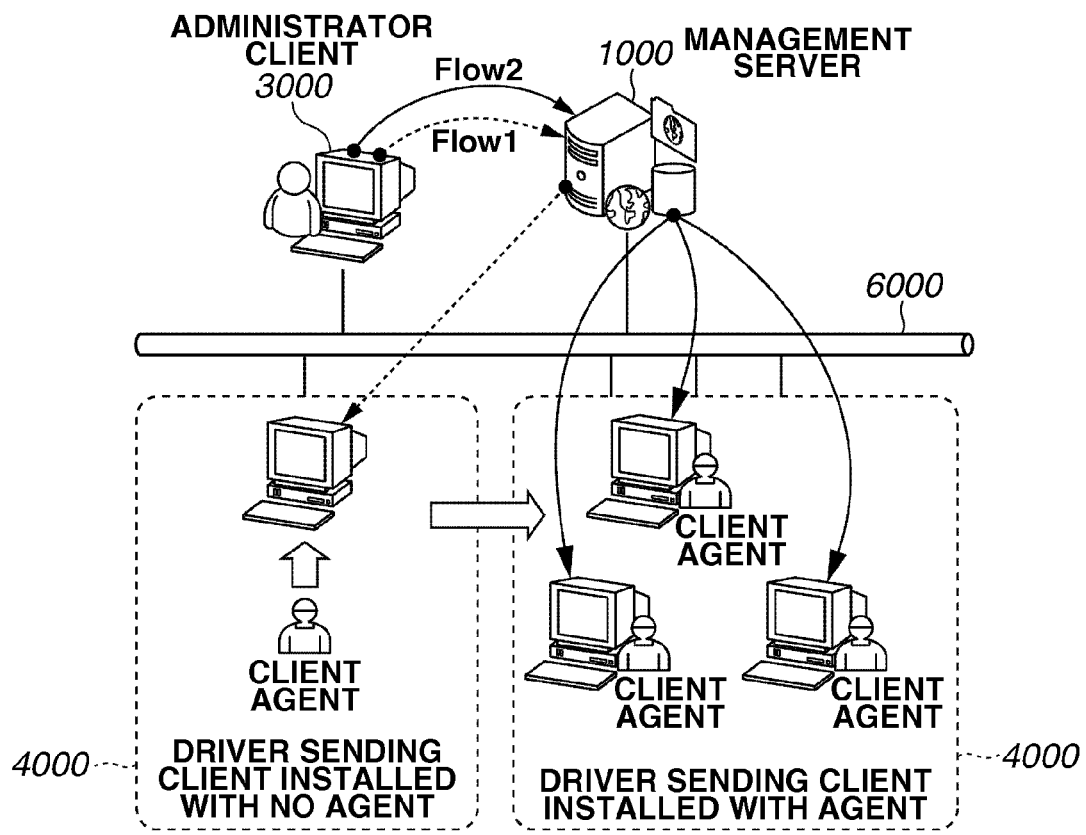

FIGS. 2A and 2B each illustrates an example of an operation performed by the printing system in an operation environment (PUSH mode) in which the print server 5000 is not used according to the present exemplary embodiment. More specifically, FIGS. 2A and 2B each illustrates an example of an operation performed by the printing system in the operation environment such as a peer to peer communication (PUSH mode), in which the driver sending client 4000 directly instructs the device 2000 to perform printing.

FIG. 2A illustrates a state where the device 2000 has entered the network environment in which the management server 1000, the administrator client 3000, and the driver sending client 4000 are connected to the communication line 6000. In the present exemplary embodiment, it is supposed that a setting for performing a unicast UPnP with respect to the management server 1000 has been previously performed for the second UPnP control unit 2720 of the device 2000.

Accordingly, when the device 2000 enters the network, the second UPnP control unit 2720 of the device 2000 sends a network entry message (a Hello message in WSD, for example) to the management server 1000 by unicast.

FIG. 2B illustrates a state in which the client agent and the driver are installed on the driver sending client 4000. In the example illustrated in FIG. 2B, a broken line arrow (Flow1) indicates that the management server 1000 installs the client agent on the driver sending client 4000.

The client agent installed here is the fourth service program unit 4710 illustrated in FIG. 1. In the present exemplary embodiment, it is supposed that the client agent has been installed on the driver sending client 4000 before the device 2000 enters the network. In addition, in the example illustrated in FIG. 2B, a solid line arrow (Flow2) indicates that the management server 1000 installs the driver on the driver sending client 4000 upon performing the unicast UPnP, which is performed when the device 2000 enters the network. Here, all of the drivers are installed on the driver sending client 4000 in the PUSH mode according to the present exemplary embodiment.

Figure 3A:
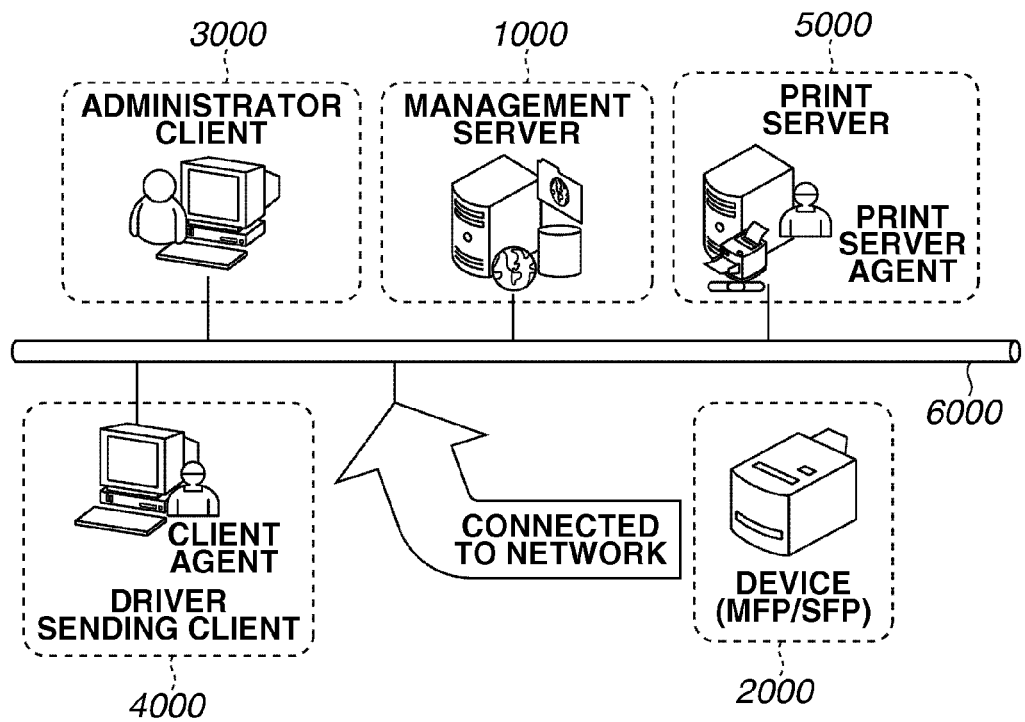
FIGS. 3A and 3B each illustrates an example of an operation performed by the printing system in an operation environment (print server mode) in which the print server according to the first exemplary embodiment is used.
Figure 3B:
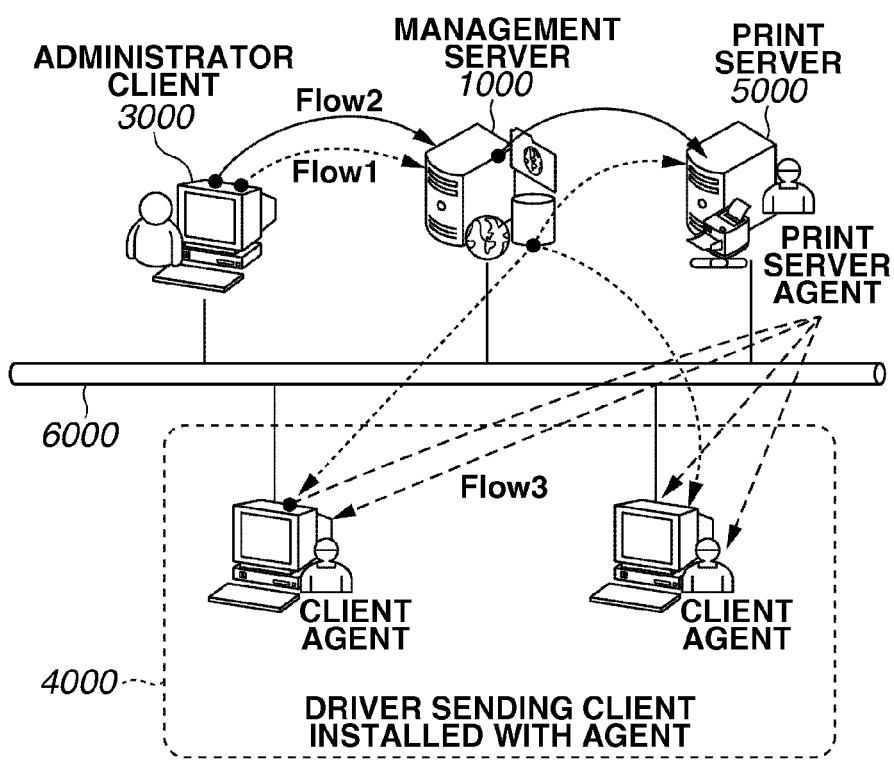

FIGS. 3A and 3B each illustrates an example of an operation performed by the printing system in the operation environment in which the print server 5000 is used (the print server mode) according to the present exemplary embodiment. More specifically, FIGS. 3A and 3B each illustrates an example of an operation performed by the printing system in the operation environment such as the print server mode in which the driver sending client 4000 instructs the device 2000 via the print server 5000 to perform printing.

FIG. 3A illustrates a state where the device 2000 has entered the network environment in which the management server 1000, the administrator client 3000, the driver sending client 4000, and the print server 5000 are connected to the communication line 6000. In the present exemplary embodiment, it is supposed that a setting for performing the unicast UPnP on the management server 1000 has been previously performed on the second UPnP control unit 2720 of the device 2000.

As described above, when the device 2000 enters the network, the second UPnP control unit 2720 of the device 2000 sends a network entry message (a Hello message in WSD, for example) to the management server 1000 by unicast.

FIG. 3B illustrates a state in which the client agent and the driver are installed on the driver sending client 4000, the print server agent is installed on the print server 5000, and printing is performed by point and printing.

In the example illustrated in FIG. 3B, a broken line arrow (Flow1) indicates that the management server 1000 installs the driver on the driver sending client 4000 and the print server agent on the print server 5000. It is supposed here that the client agent (the fourth service program unit 4710) has been installed on the driver sending client 4000 before the device 2000 enters the network. In addition, it is supposed here that the print server agent (the fifth service program unit 5710) has been installed on the device 2000 before the device 2000 enters the network.

Furthermore, in the example illustrated in FIG. 3B, a solid line arrow (Flow2) indicates that the management server 1000 installs the driver on the print server 5000 upon performing the unicast UPnP, which is performed when the device 2000 enters the network. In the print server mode according to the present exemplary embodiment, at least the driver for performing spooling, among the drivers (printer drivers) for operating the device 2000, is installed on the print server 5000.

In addition, in the example illustrated in FIG. 3B, a dotted line arrow (Flow3) indicates that the driver installed on the print server 5000 is utilized by the driver sending client 4000 for the point and print. Here, in the print server mode according to the present exemplary embodiment, at least a UI driver, among the drivers (printer drivers) for operating the device 2000, is installed on the driver sending client 4000.

Now, an example of a basic operation performed by the printing system according to the present exemplary embodiment will be described below with reference to the flow chart of FIG. 4. Before advancing to the processing in FIG. 4, the device 2000 performs UPnP by unicast (unicast UPnP) to the management server 1000 when the device 2000 is connected to the network (the communication line 6000).

Figure 4:
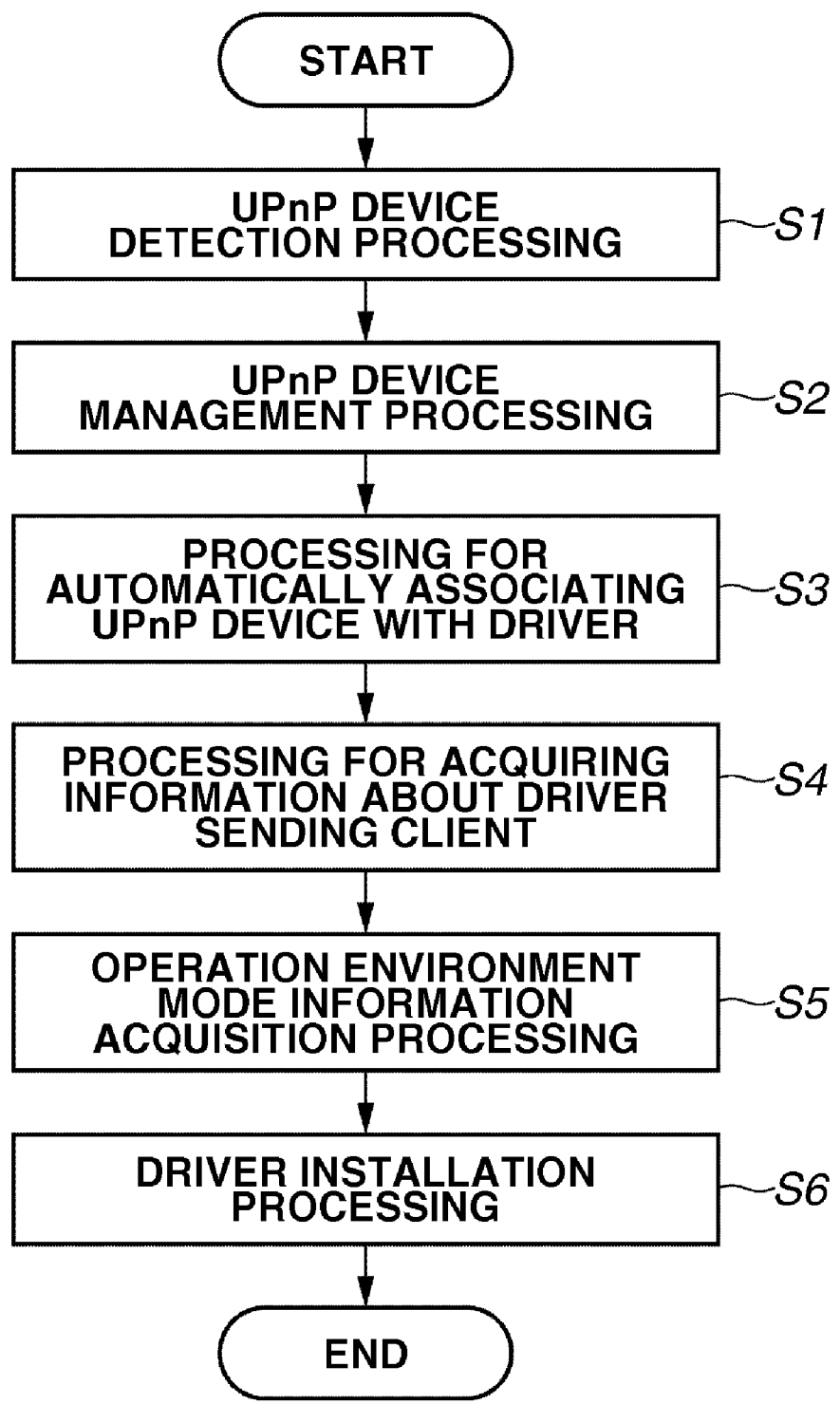
FIG. 4 is a flow chart that illustrates an example of a basic operation performed by the printing system according to the first exemplary embodiment of the present invention.

After performing the above-described processing, in step S1 in FIG. 4, the management server 1000 performs UPnP device detection processing for detecting the device 2000 (the UPnP device).

In step S2, the management server 1000 performs UPnP device management processing for managing the device 2000 extracted in step S1. Then, the management server 1000 detects a driver that complies with the device 2000 extracted in step S1.

In step S3, the management server 1000 performs automatic association processing for automatically associating the device 2000 extracted in step S1 with the extracted driver. In step S4, the management server 1000 performs driver sending client information acquisition processing for acquiring information about the driver sending client 4000, which is a driver sending destination apparatus, according to a device attribute of the device 2000 extracted in step S1.

In step S5, the management server 1000 performs operation environment mode information acquisition processing for acquiring operation environment mode information about the operation environment mode, which is set related to the printing from the driver sending client 4000 to the device 2000. In step S6, the management server 1000 performs driver installation processing for installing the driver for the device 2000 on the driver sending client 4000 according to the operation environment mode acquired in step S5. Then, the processing ends.

Now, an example of an operation performed by the printing system according to the present exemplary embodiment will be described in detail below with reference to FIG. 5. Before advancing to the processing illustrated in FIG. 5, the processing for associating the device attribute with the driver sending client 4000 and the print server 5000 and processing for setting the operation environment mode are performed before the device 2000 enters the network (the communication line 6000).

Figure 5:
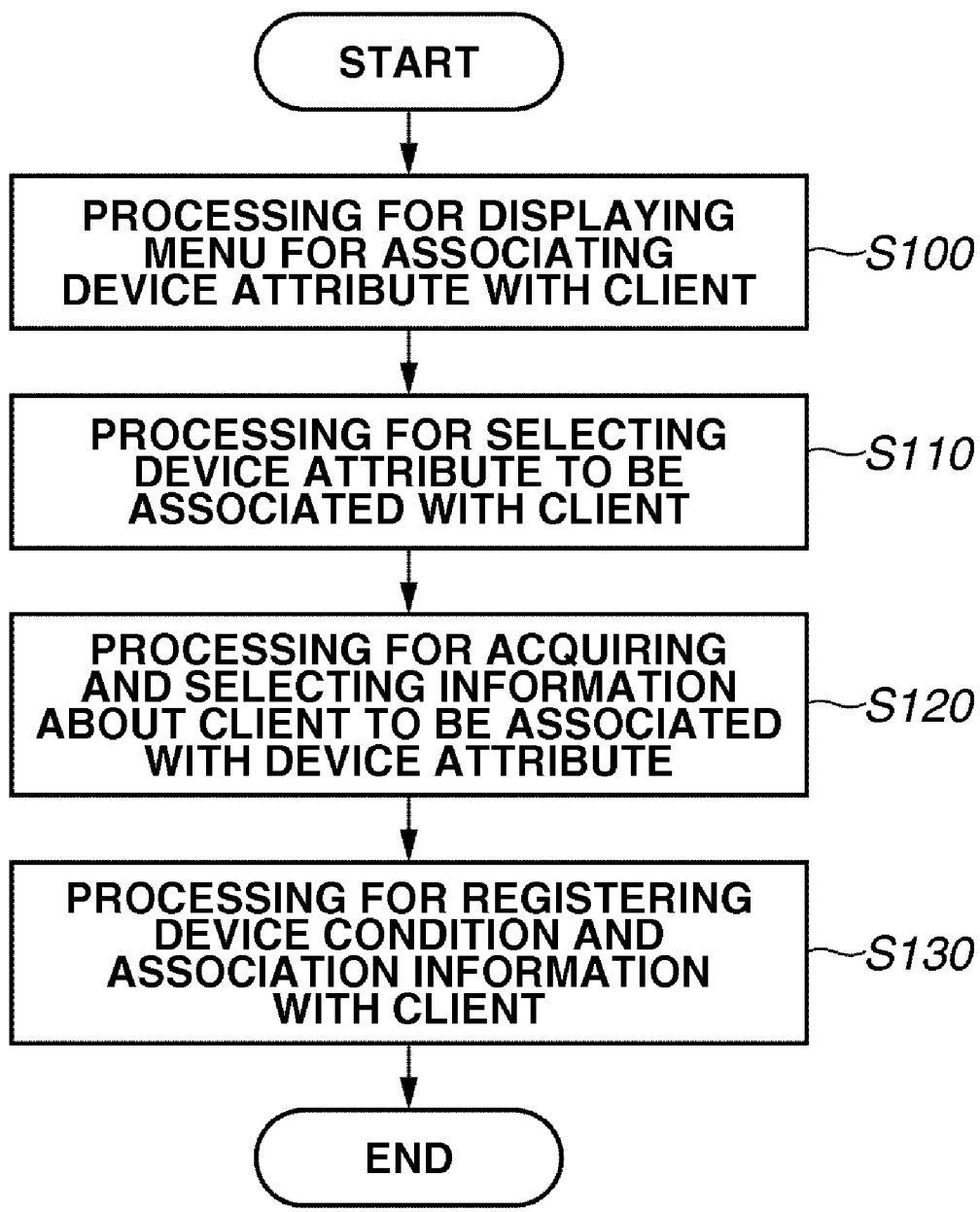
FIG. 5 is a flow chart that illustrates an example of an operation performed by a management server during processing for associating a device attribute with a driver sending client according to the first exemplary embodiment of the present invention.

FIG. 5 is a flow chart that illustrates an example of an operation performed by the management server 1000 during processing for associating the device attribute with the driver sending client 4000 according to the present exemplary embodiment. At first, the administrator of the printing system accesses the first device management application unit 1710 of the management server 1000 via the web browser by operating the third display unit 3100 and the third input unit 3200 of the administrator client 3000.

In this case, the first driver management control unit 1714 displays a menu for the first device management application unit 1710 on the third display unit 3100. Then, the administrator selects an "associate device attribute with client" item from the menu.

In this case, in step S100 in FIG. 5, the first driver management control unit 1714 displays a UI screen for associating the attribute of the device 2000 (the device attribute) with the client.

Figure 6:
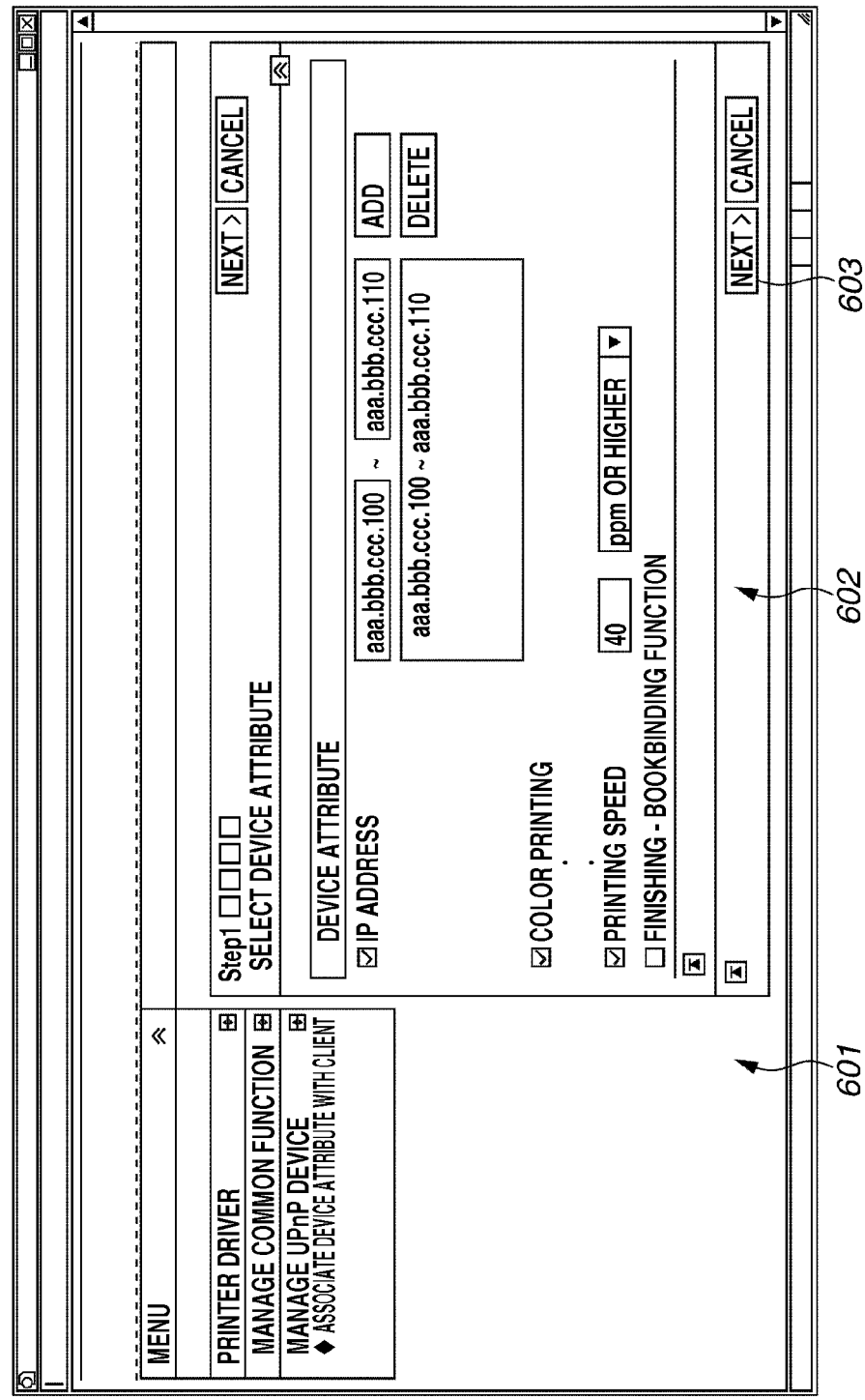
FIG. 6 illustrates an example of a user interface (UI) screen displayed when an "associate device attribute with client" item is selected from a menu by a user according to the first exemplary embodiment of the present invention.

FIG. 6 illustrates an example of the UI screen displayed when the administrator selects the "associate device attribute with client" item from a menu according to the present exemplary embodiment.

Referring to FIG. 6, in a UI screen 600, a menu is displayed in a field 601, which is arranged in a left portion thereof, and a content corresponding to the menu is displayed in a field 602, which is arranged in a right portion thereof. When the administrator selects the "associate device attribute with client" item from the menu, a "select device attribute" screen is displayed in the right field 602 as illustrated in FIG. 6.

In step S110, the first driver management control unit 1714 inputs the attribute of the device 2000 to be associated with the driver sending client 4000 according to the selection by the administrator performed via the "select device attribute" screen.

In the present exemplary embodiment, as illustrated in FIG. 6, an Internet Protocol (IP) address, a color printing, a printing speed, and a finishing-bookbinding function are provided as the attribute of the device 2000. The administrator can perform a selection for each of the attributes of the device 2000 as follows.

The IP address attribute of the device 2000 refers to an IP address of the UPnP device 2000 including the UPnP function itself. In the example illustrated in FIG. 6, the devices 2000 whose IP address ranges from "aaa.bbb.ccc.100" to "aaa.bbb.ccc.110" are described.

The color printing attribute of the device 2000 refers to either a state where color printing (and monochromatic printing) can be performed or a state where monochromatic printing only can be performed. In the example illustrated in FIG. 6, the UPnP device 2000 that can perform color printing is targeted.

The printing speed attribute of the device 2000 refers to a printing speed capacity of the UPnP device 2000. In the example illustrated in FIG. 6, the UPnP device 2000 having a printing speed of 40 pages per minute (ppm) or higher is targeted.

The finishing-bookbinding function attribute of the device 2000 refers to an attribute about whether to use a bookbinding function as a condition in the case where the bookbinding function is included in finishing functions of the UPnP device 2000. In the example illustrated in FIG. 6, the condition that the bookbinding function is included in the finishing functions of the UPnP device 2000 is not used.

Note that the above-described attributes are mere examples of the attributes of the device 2000. That is, various items can be used as the attribute of the device 2000 if the items indicate information that can be acquired by sending and receiving the device metadata by UPnP between the management server 1000 and the device 2000.

For example, in addition to or instead of the above-described attributes, a page description language (PDL), such as Printer Control Language (PCL) or PostScript (PS), or a point of destination of the device (the name of a country, such as Japan, the United States, or the United Kingdom) can be used as the attribute of the device 2000.

When the user (administrator) presses a "next" button 603 on the UI screen 600 illustrated in FIG. 6, the first driver management control unit 1714 performs the following processing. That is, in step S120, the first driver management control unit 1714 displays a UI screen for selecting the driver sending client 4000 to be associated with the attribute of the device 2000 set by the user via the UI screen 600.

Figure 7:
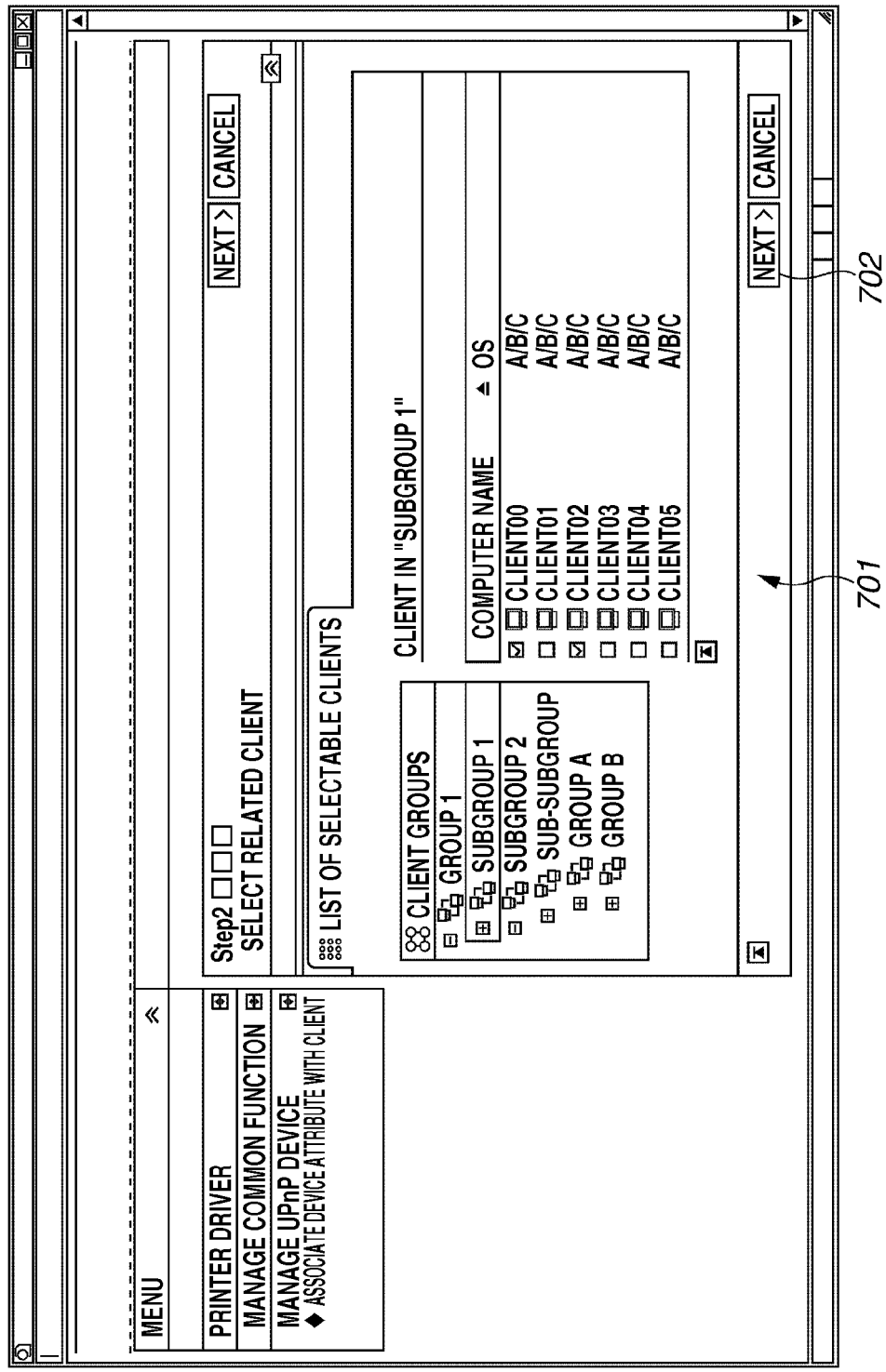
FIG. 7 illustrates an example of a UI screen for selecting a driver sending client to be associated with a device attribute according to the first exemplary embodiment of the present invention.

FIG. 7 illustrates an example of the UI screen for selecting the driver sending client 4000 to be associated with the device attribute (the attribute of the device 2000) according to the present exemplary embodiment.

Referring to FIG. 7, a list of clients 701 displayed on a UI screen 700 illustrated in FIG. 7 is a list of the driver sending clients 4000. The content included in the list of clients 701 is previously stored on the first information storage unit 1715 by performing processing for searching for a client or by exporting a comma separated value (CSV) file.

In the example illustrated in FIG. 7, the driver sending client 4000 that belongs to an arbitrary client group in a tree is selected. However, the present exemplary embodiment is not limited to this. That is, the driver sending client 4000 can be selected with respect to each client group, instead of selecting the same with respect to each client.

FIG. 8 illustrates an example of a table related to the driver sending client 4000 that is previously stored on the first information storage unit 1715 according to the present exemplary embodiment. Referring to FIG. 8, a table 800 includes a client identification (ID) field, an operating system (OS) name field, an IP address field, and a group relationship field.

In the example illustrated in FIG. 7, client terminal apparatuses "CLIENT00" and "CLIENT02", which belong to a client group "subgroup 1 of group 1", have been selected as the driver sending client 4000 to be associated with the attribute of the device 2000.

In step S130, when the user presses a "next" button 702 on the UI screen 700 illustrated in FIG. 7, the management server 1000 displays a UI screen that enables the user to verify the content of the selection performed by the user via the UI screens 600 and 700 illustrated in FIG. 6 and FIG. 7 and to register the verified content.

Figure 9:
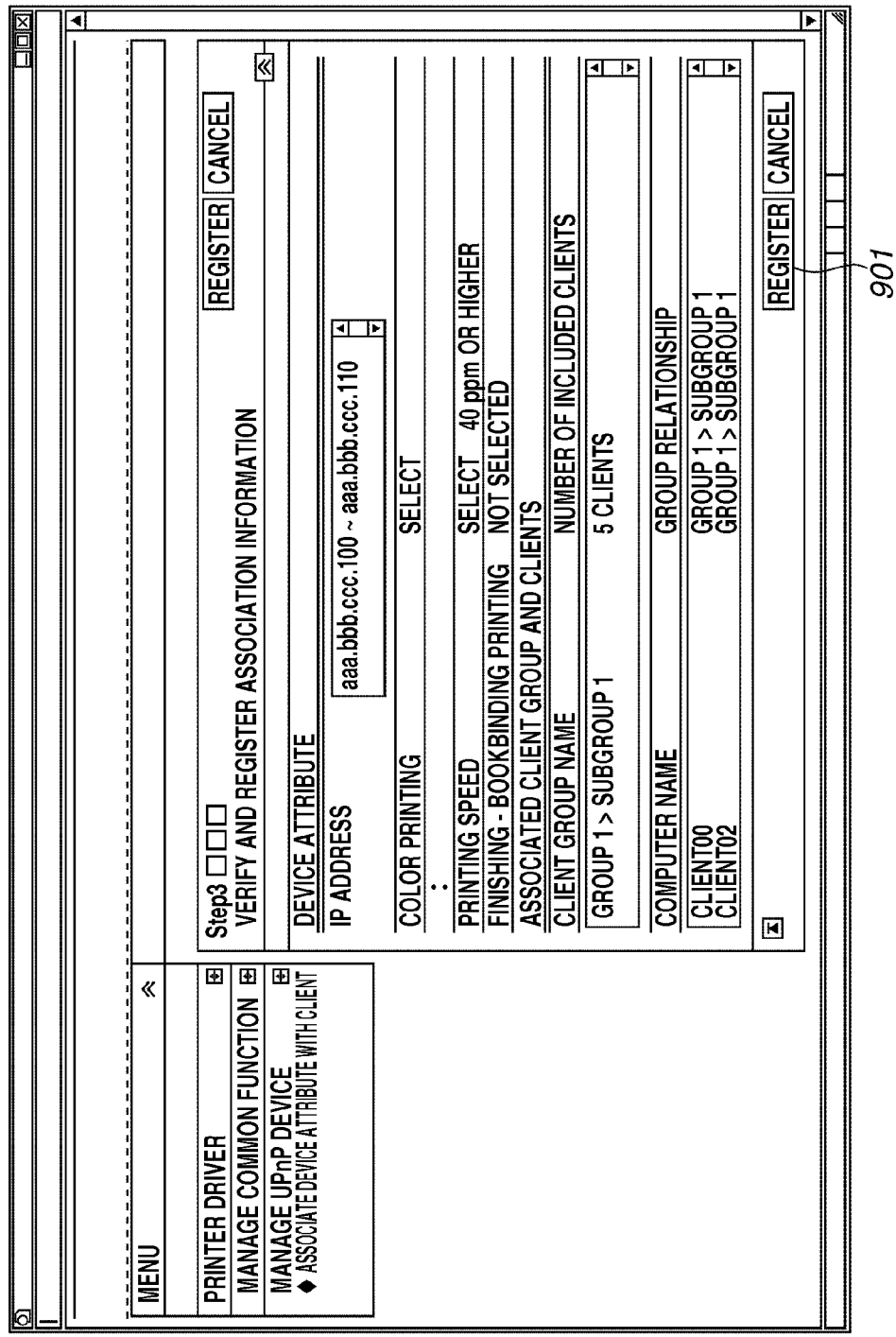
FIG. 9 illustrates an example of a UI screen for verifying and registering the content of selection performed by a user of the printing system via the UI screen illustrated in FIGS. 6 and 7 according to the first exemplary embodiment of the present invention.

FIG. 9 illustrates an example of a UI screen for verifying and registering the content of a selection performed by the user via the UI screens 600 and 700 illustrated in FIGS. 6 and 7 according to the present exemplary embodiment.

Referring to FIG. 9, when the user presses a "register" button 901 via a UI screen 900 illustrated in FIG. 9, the first driver management control unit 1714 stores the content of a setting performed via the UI screens 600 and 700 illustrated in FIG. 6 and FIG. 7 on the first information storage unit 1715.

FIGS. 10 through 13 each illustrates an example of a table (tables 110, 111, 112, and 113) for storing the content of a setting performed by the user via the UI screen 600 illustrated in FIG. 6. FIG. 14 illustrates an example of a table 114 for storing the content of a setting performed by the user via the UI screen 700 illustrated in FIG. 7.

FIG. 15 illustrates an example of a table 115 for storing the device attribute (the attribute of the device 2000) and the driver sending client 4000 associated with each other according to the present exemplary embodiment. The tables 110 through 115, which are illustrated in FIGS. 10 through 15, are stored in the first information storage unit 1715 in step S130.

Among the examples of the tables 110 through 115 illustrated in FIG. 10 through FIG. 15, the table 115 illustrated in FIG. 15 is a main table. The table 115 illustrated in FIG. 15 associates a device attribute ID with the selected client ID and stores therein the mutually associated device attribute ID and the selected client ID.

The content of the device attribute ID is stored in the tables 110 through 113 illustrated in FIGS. 10 through 13, while the content of the selected client ID is stored in the table 114 illustrated in FIG. 14. For example, a device attribute ID "SelectedDevAttr-1" in FIG. 15 is associated with a selected client ID "SelectedClients-1".

In the present exemplary embodiment, it is supposed that the attribute of the device 2000 matches the content of the selected client ID "SelectedDevAttr-1". In this case, the driver that complies with the device 2000 is installed on the driver sending client 4000 having the selected client ID "SelectedClients-1".

The device attribute ID "SelectedDevAttr-1" is constituted by columns, such as a device attribute ID column, an IP address ID column, a color printing column, a printing speed ID column, and a finishing ID column, as illustrated in FIG. 10. Detailed contents of the IP address ID, the printing speed ID, and the finishing ID are stored in the tables 111 through 113 illustrated in FIGS. 11 through 13, respectively.

FIG. 11 illustrates an example of a subtable corresponding to the IP address ID stored in the table 110 illustrated in FIG. 10. In the table 110 illustrated in FIG. 10, an IP address ID "IPID-1" is stored as the IP address ID corresponding to the device attribute ID "SelectedDevAttr-1".

In the table 111 illustrated in FIG. 11, the IP addresses ranging from "aaa.bbb.ccc.100" to "aaa.bbb.ccc.110" are stored as the IP addresses corresponding to the IP address ID "IPID-1".

FIG. 12 illustrates an example of a subtable corresponding to the printing speed ID stored in the table 110 illustrated in FIG. 10.

In the table 110 illustrated in FIG. 10, the printing speed ID "PVID-1" is stored as the printing speed ID corresponding to the device ID "SelectedDevAttr-1". In the table 112 illustrated in FIG. 12, the printing speed whose printing speed attribute is "40" and whose condition attribute is "ppm or higher" is stored as the printing speed corresponding to the printing speed ID "PVID-1".

FIG. 13 illustrates an example of a subtable corresponding to the finishing ID stored in the table 110 illustrated in FIG. 10. In the table 110 illustrated in FIG. 10, a parameter "OFF" is stored as the finishing ID corresponding to the device ID "SelectedDevAttr-1". In this case, the finishing attribute is not used.

On the other hand, in the device ID illustrated in FIG. 10, the finishing ID for the device ID "SelectedDevAttr-2" is "FinID-1". Accordingly, in the table 113 illustrated in FIG. 13, the bookbinding function is stored as the finishing attribute corresponding to the finishing ID "FinID-1".

FIG. 14 illustrates an example of a subtable corresponding to the selected client ID of the table 115 illustrated in FIG. 15. In the table 114 illustrated in FIG. 14, "CLIENT00" and "CLIENT02" are stored as the driver sending client 4000 corresponding to the selected client ID "SelectedClients-1". Furthermore, the detailed contents of the "CLIENT00" and "CLIENT02" are stored in the table 800 illustrated FIG. 8.

As described above, the present exemplary embodiment not only previously associates the attribute of the device 2000 with the driver sending client 4000 but also previously associates the attribute of the device 2000 with the print server 5000 by performing processing similar to that illustrated in the flow chart of FIG. 5.

In this case, the administrator of the printing system selects an "associate device attribute with print server" item from the menu managed by the first device management application unit 1710. Then, the first driver management control unit 1714 displays a UI screen that associates the attribute of the device 2000 (the device attribute) with the print server 5000.

Figure 16:
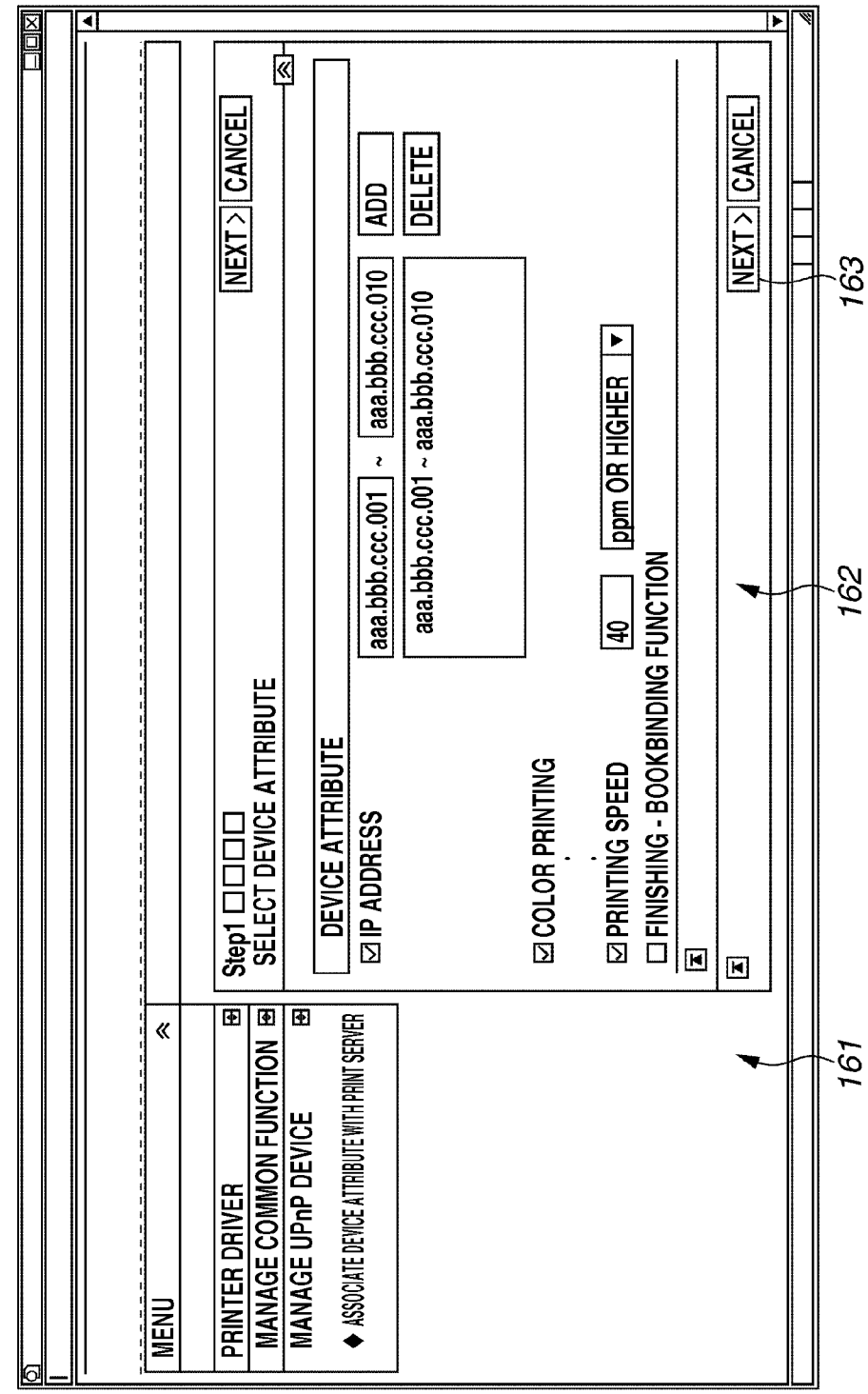
FIG. 16 illustrates an example of a UI screen displayed when an "associate device attribute with print server" item is selected from a menu according to the first exemplary embodiment of the present invention.

FIG. 16 illustrates an example of the UI screen displayed when the "associate device attribute with print server" item is selected according to the present exemplary embodiment.

Referring to FIG. 16, in a UI screen 160, a menu is displayed in a field 161, which is arranged in a left portion thereof, and a content corresponding to the menu is displayed in a field 162, which is arranged in a right portion thereof, as in the UI screen 600 illustrated in FIG. 6.

Then, the first driver management control unit 1714 inputs the attribute of the device 2000 to be associated with the print server 5000 according to the operation by the administrator for selecting the device attribute performed via a "select device attribute" field in the UI screen 160. In the example illustrated in FIG. 16, an IP address, a color printing, a printing speed, and a finishing-bookbinding function are provided as items to be selected as the attribute of the device 2000 as in the example illustrated in FIG. 6.

When the administrator presses a "next" button 163 via the UI screen 160 illustrated in FIG. 16, the first driver management control unit 1714 displays a UI screen for selecting the print server 5000 to be associated with the attribute of the device 2000 that has been set by the administrator via the UI screen 160.

Figure 17:
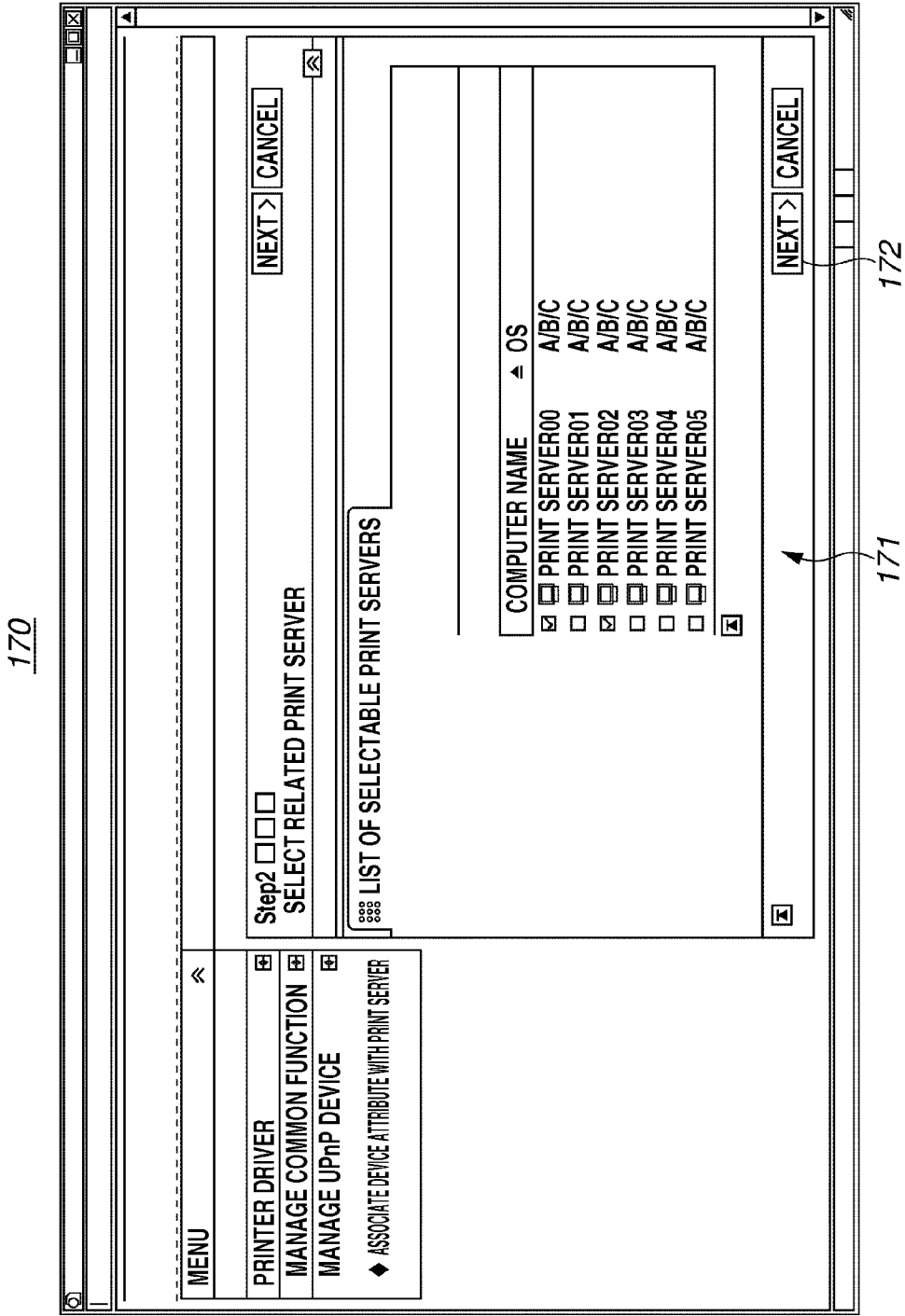
FIG. 17 illustrates an example of a UI screen for selecting a print server to be associated with a device attribute according to the first exemplary embodiment of the present invention.

FIG. 17 illustrates an example of a UI screen for selecting the print server 5000 to be associated with the device attribute (the device attribute of the device 2000) according to the present exemplary embodiment.

Referring to FIG. 17, a list of print servers 171 displayed on a UI screen 170 illustrated in FIG. 17 is a list of print servers 5000. Here, it is supposed that a content of the list of print servers 171 is previously stored on the first information storage unit 1715 by performing processing for searching for a server or by exporting a CSV file.

In the example illustrated in FIG. 17, a print server 5000 is independently and separately selected. However, the present exemplary embodiment is not limited to this. That is, the print server 5000 can be selected with respect to each server group, instead of selecting the same with respect to each server. It is to be noted here that the table related to the print server 5000, which is previously stored on the first information storage unit 1715, has the same content as that stored in each of the tables 110 through 115 illustrated in FIGS. 10 through 15. However, the difference is that the "selected client ID" field in the examples illustrated in FIGS. 14 and 15 is substituted with a "selected print server ID" field in the example illustrated in FIG. 17. In the same way, the "selected client" field illustrated in FIG. 14 is substituted with a "selected print server" field in the example illustrated in FIG. 17.

Figure 18:
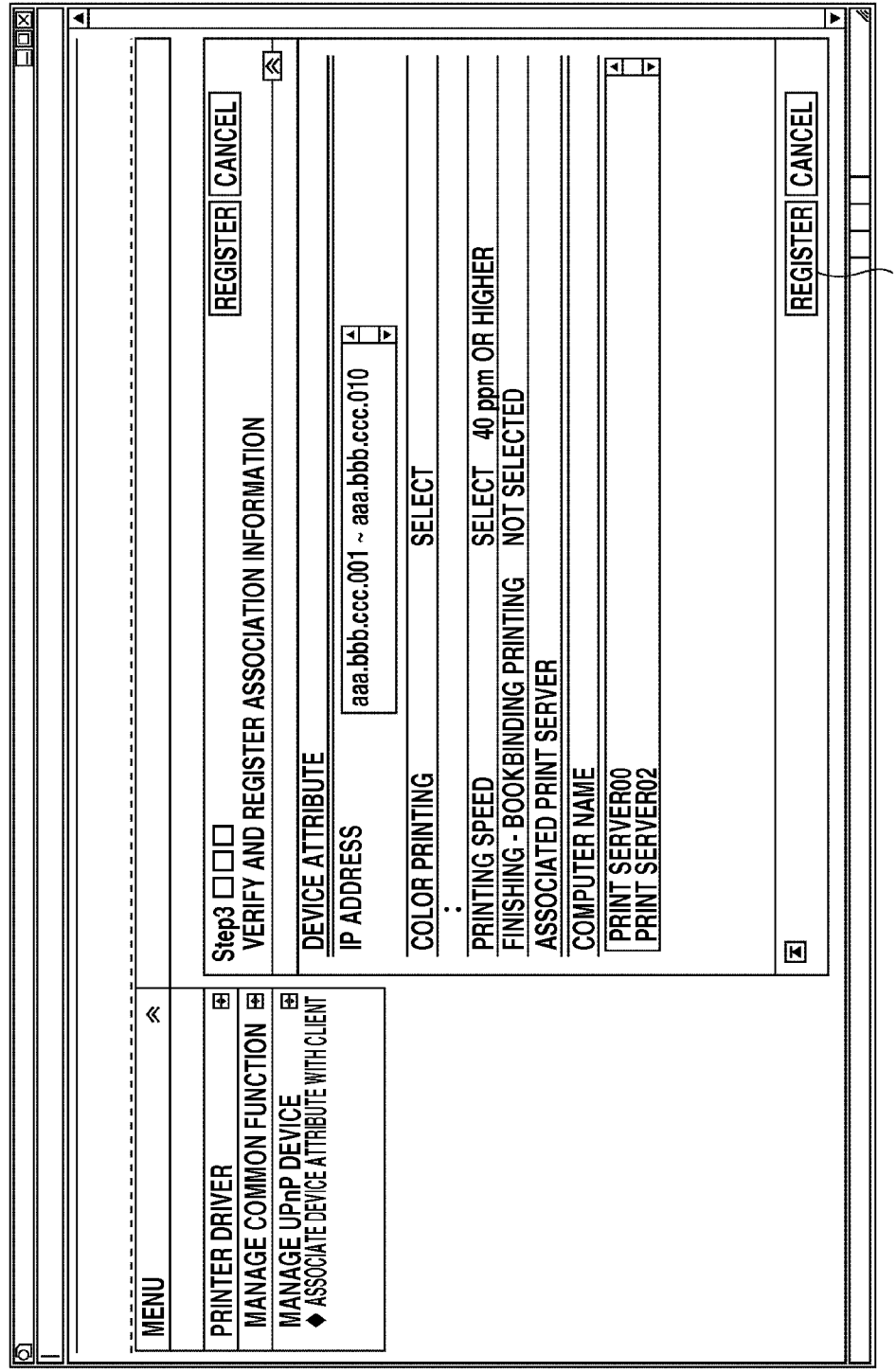
FIG. 18 illustrates an example of a UI screen for verifying and registering the content of the selection performed by a user of the printing system via the UI screens illustrated in FIGS. 16 and 17 according to the first exemplary embodiment of the present invention.

FIG. 18 illustrates an example of a UI screen for verifying and registering the content of the selection performed via the UI screens 160 and 170 illustrated in FIGS. 16 and 17.

Referring to FIG. 18, when the administrator presses the "next" button 172 via the UI screen 170 illustrated in FIG. 17, a UI screen 180 is displayed. When the administrator presses a "register" button 181 via the UI screen 180, the first driver management control unit 1714 stores the content of the setting performed via the UI screens 160 and 170 illustrated in FIGS. 16 and 17 on the first information storage unit 1715.

By performing the above-described processing, the present exemplary embodiment previously associates the attribute of the device 2000 with the print server 5000.

As described above, in the present exemplary embodiment, an exemplary registration unit is implemented by performing at least the processing in the flow chart of FIG. 5.

Now, an example of an operation performed by the management server 1000 for setting an operation environment mode related to printing from the driver sending client 4000 to the device 2000 will be described in detail below with reference to the flow chart of FIG. 19.

Figure 19:
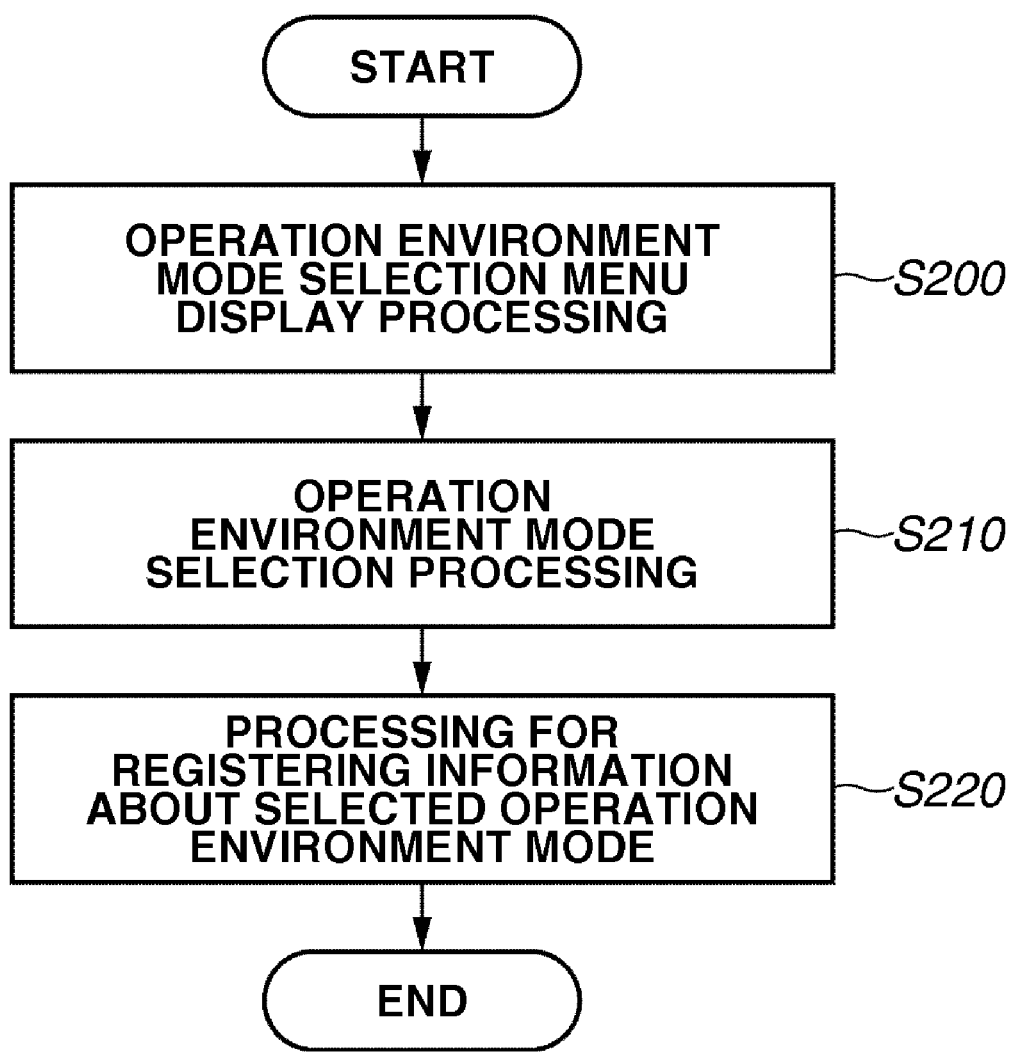
FIG. 19 is a flow chart that illustrates an example of an operation performed by a management server in setting an operation environment mode related to printing from a driver sending client to a device according to the first exemplary embodiment of the present invention.

Before advancing to the processing illustrated in FIG. 19, the administrator accesses the first device management application unit 1710 of the management server 1000 via the web browser by operating the third display unit 3100 and the third input unit 3200 of the administrator client 3000.

Referring to FIG. 19, in step S200, the first driver management control unit 1714 displays the menu managed by the first device management application unit 1710 on the third display unit 3100. Then, the administrator selects an "operation environment mode" item from the menu. After that, the first driver management control unit 1714 displays a UI screen for selecting the operation environment mode.

Figure 20:
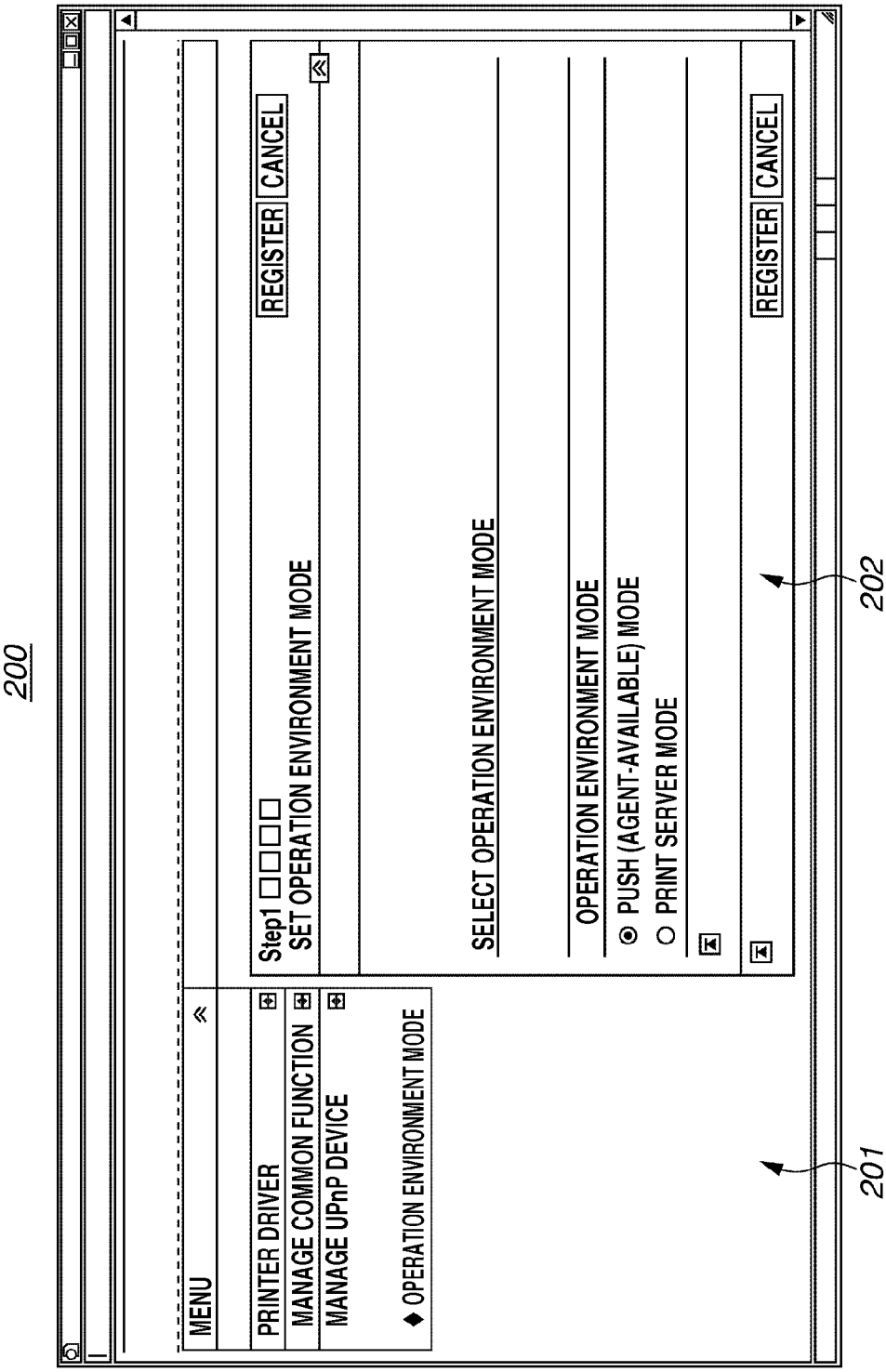
FIG. 20 illustrates an example of a UI screen displayed when an "operation environment mode" item is selected from a menu according to the first exemplary embodiment of the present invention.

FIG. 20 illustrates an example of a UI screen displayed when an "operation environment mode" item is selected from the menu according to the first exemplary embodiment of the present invention.

Referring to FIG. 20, in a UI screen 200, a menu is displayed in a field 201, which is arranged in a left portion thereof, and a content corresponding to the menu is displayed in a field 202, which is arranged in a right portion thereof. When the administrator selects the "operation environment mode" item, a "set operation environment mode" screen is displayed in the right field 202 as illustrated in FIG. 20.

Returning to FIG. 19, in step S210, the first driver management control unit 1714 inputs the operation environment mode related to the printing from the driver sending client 4000 to the device 2000 according to the operation by the administrator for selecting the operation environment mode performed via the "set operation environment mode" screen. In the present exemplary embodiment, the operation environment mode includes a "PUSH (agent-installed) mode" and a "print server mode".

The administrator selects the "PUSH (agent-installed) mode", for example, and presses a "register" button illustrated in FIG. 20. Here, the "PUSH (agent-installed) mode" is a mode that operates in the operation environment for printing illustrated in FIGS. 2A and 2B. The PUSH mode is an operation environment for generating print data by utilizing the driver installed on the driver sending client 4000 and implementing printing with the device 2000 by directly using a line printer (LPR) port via the network (the communication line 6000).

Furthermore, the driver sending client 4000 includes the fourth service program unit 4710, which is a client agent that operates in the above-described PUSH mode. The client agent communicates with the first driver management control unit 1714, acquires the driver from the first driver storage unit 1716, and installs the acquired driver on the driver sending client 4000.

Meanwhile, the "print server mode" is an operation environment for implementing the printing illustrated in FIGS. 3A and 3B. In the print server mode, the printing from the driver sending client 4000 to the device 2000 is the operation mode performed in a so-called "print server printing environment". That is, in the print server mode, the printing from the driver sending client 4000 to the device 2000 is performed via the print server 5000.

In addition, the print server 5000 includes the fifth service program unit 5710, which is a print server agent that operates in the print server mode. The print server agent communicates with the first driver management control unit 1714, acquires the driver from the first driver storage unit 1716, and installs the acquired driver on the print server 5000.

Furthermore, the driver sending client 4000 implements the printing from the driver sending client 4000 to the device 2000 by using the driver installed on the print server 5000 with the point and printing method.

Referring back to FIG. 19, in step S220, the first driver management control unit 1714 stores the information about the operation environment mode input in step S210 in the first information storage unit 1715.

FIG. 21 illustrates an example of a table for storing information about the operation environment mode in the first information storage unit 1715 according to the first exemplary embodiment of the present invention. Referring to FIG. 21, a table 210 stores information input when the administrator has selected the PUSH mode via the UI screen 200 illustrated in FIG. 20.

Thus, in the examples described above, the following contents are selected (as illustrated in FIGS. 10 through 13):

IP address attribute: IP addresses ranging from "aaa.bbb.ccc.100" to "aaa.bbb.ccc.110"

Color printing attribute: available

Printing speed attribute: 40 ppm or higher.

When the above-described UPnP device 2000 has been extracted as a result of the search, the driver is installed on the driver sending clients 4000 ("CLIENT00" and "CLIENT02") in the operation environment mode of the PUSH mode, as illustrated in FIGS. 14, 15, and 20.

As described above, in the present exemplary embodiment, an exemplary setting unit is implemented by performing at least the processing in the flow chart of FIG. 19.

Now, an operation performed by the printing system according to the present exemplary embodiment will be described in detail below with reference to flow charts of FIGS. 22A through 22C. To begin with, the UPnP device detection processing in step S1 in FIG. 4 will be described below.

Figure 22A:
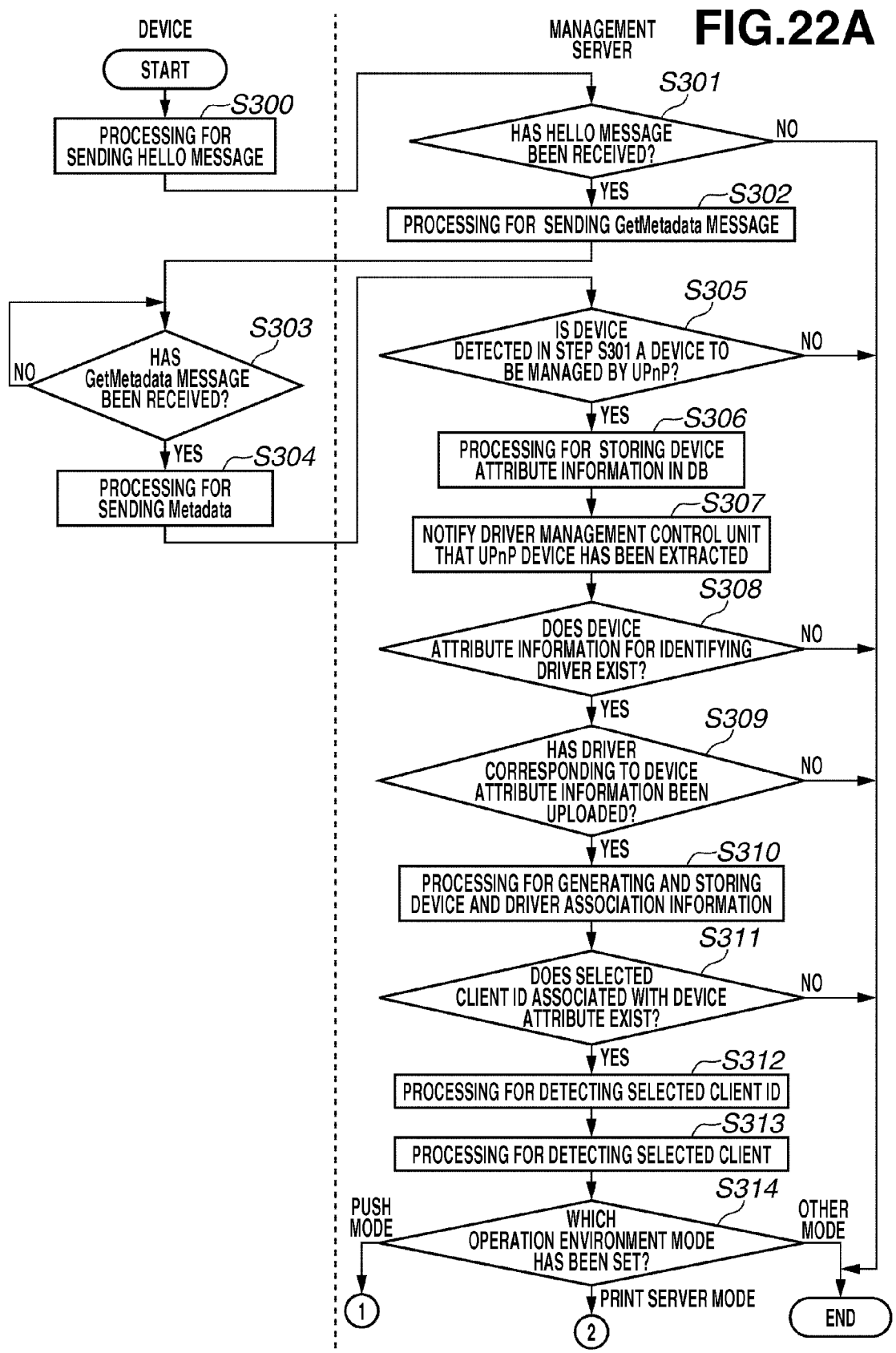
FIG. 22A is a flow chart that illustrates a detailed example of an operation performed by the printing system according to the first exemplary embodiment of the present invention.

Referring to FIG. 22A, in step S300, when the device 2000 is connected to the network (enters the network (the communication line 6000)), the UPnP control unit 2720 sends a network entry message, which indicates that a new device has entered the network, to the network (the communication line 6000) by unicast. In the present exemplary embodiment, the UPnP control unit 2720 sends a Hello message, which is defined by WSD as the network entry message, to the management server 1000 by unicast. As described above, the device 2000 sends a Hello message to only the management server 1000.

In step S301, the first device management control unit 1712 of the management server 1000 determines whether the message received via the first UPnP control unit 1720 is the Hello message.

Figure 22B:
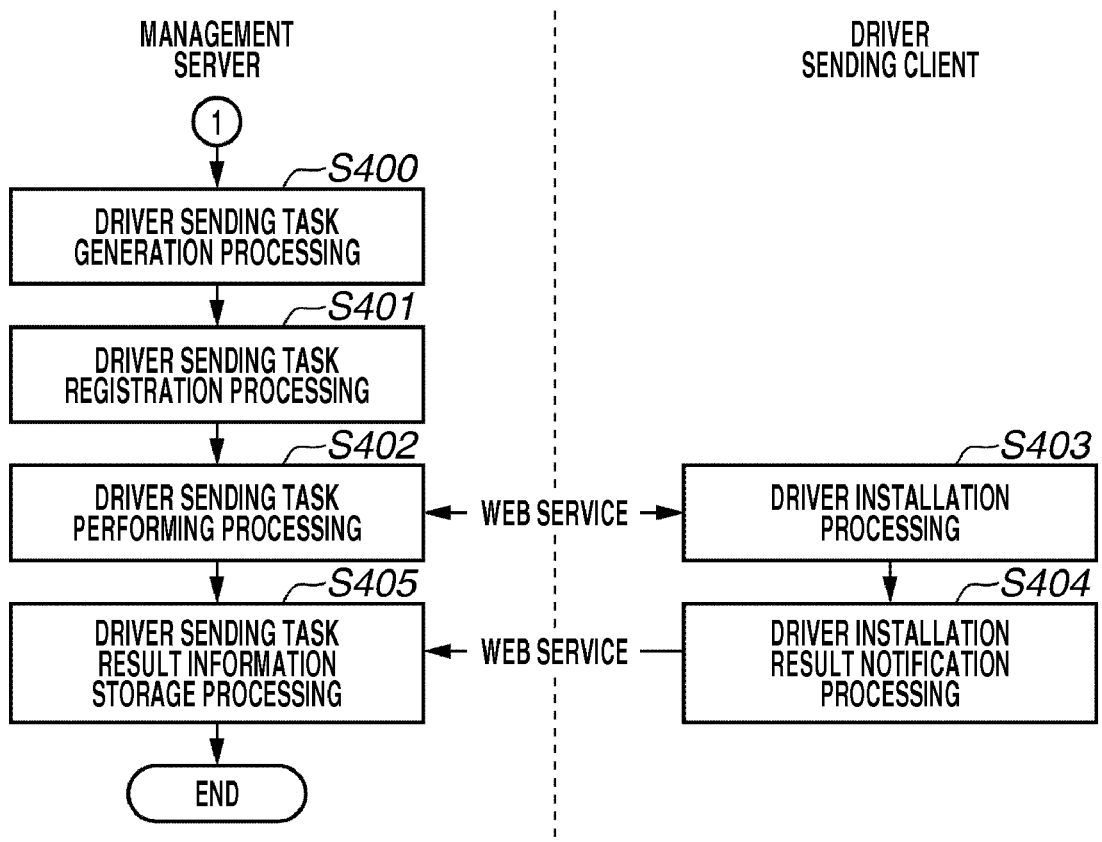
FIG. 22B is a flow chart that illustrates processing performed subsequent to the processing in FIG. 22A according to the first exemplary embodiment of the present invention.
Figure 22C:
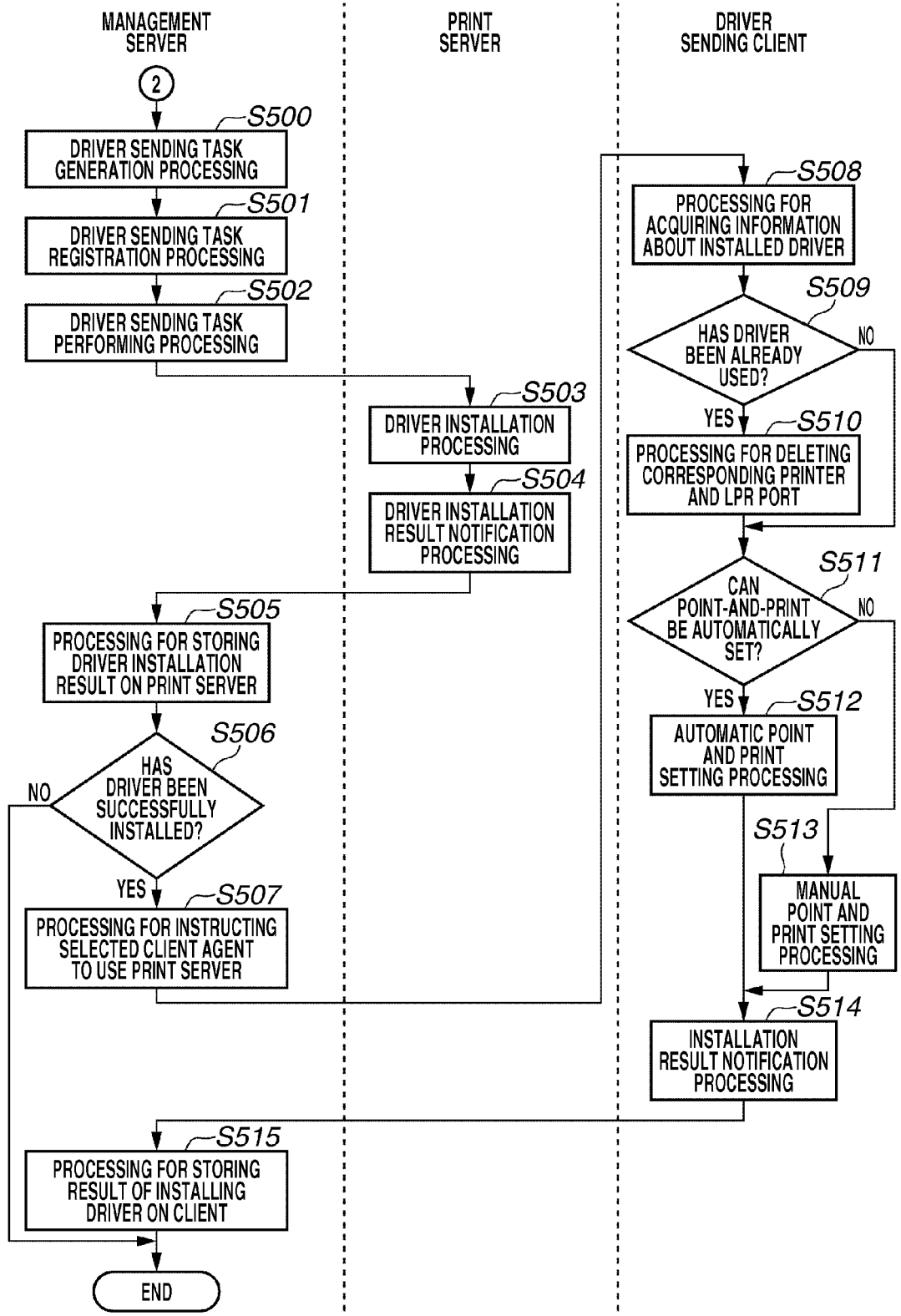
FIG. 22C is a flow chart that illustrates processing performed subsequent to the processing in FIG. 22A according to the first exemplary embodiment of the present invention.

If it is determined as a result of the determination in step S301 that the received message is not the Hello message (NO in step S301), then the processing in the flow charts of FIGS. 22A through 22C ends.

On the other hand, if it is determined as a result of the determination in step S301 that the received message is the Hello message (YES in step S301), then the processing advances to step S302.

As described above, in the present exemplary embodiment, an exemplary receiving unit is implemented by performing at least the processing of step S301.

In step S302, the first device management control unit 1712 sends a reply message in response to the network entry message to the device 2000 via the second UPnP control unit 2720 and the first UPnP control unit 1720.

The sending of the reply message is performed to acquire the device metadata. Here, a GetMetadata message defined by WSD is sent as the reply message.

In step S303, the first device management control unit 1712 waits until the device 2000 acquires the GetMetadata message via the second UPnP control unit 2720 and the first UPnP control unit 1720.

After acquiring the GetMetadata message, the processing advances to step S304. In step S304, the UPnP control unit 2720 of the device 2000 sends metadata (device metadata) to the management server 1000 via the network (the communication line 6000).

As described above, the metadata (the device metadata) includes data indicating the attribute of the device 2000 and data related to the driver for the device 2000. The details of the UPnP device detection processing in step S1 in FIG. 4 are as described above in steps S300 through S304.

Now, the UPnP device management processing in step S2 in FIG. 4 will be described in detail below. Here, the first device management control unit 1712 acquires the metadata sent in step S304.

In step S305, the first device management control unit 1712 determines whether the device 2000 extracted in step S301 is a device to be managed by UPnP based on the acquired metadata.

In the present exemplary embodiment, the determination in step S305 is performed by determining whether the device 2000 is a device that includes a print function and whether the device 2000 is a device to be managed by UPnP based on the acquired metadata.

As described above, in the present exemplary embodiment, an exemplary second receiving unit is implemented by performing at least the processing in step S305.

If it is determined in step S305 that the device 2000, which is a communication target apparatus, is not a device to be managed by UPnP (NO in step S305), then the processing in the flow charts of FIGS. 22A through 22C ends. On the other hand, if it is determined in step S305 that the device 2000, which is a communication target apparatus, is a device to be managed by UPnP (YES in step S305), then the processing advances to step S306.

In step S306, the first device management control unit 1712 stores information that indicates the attribute of the device 2000, which is included in the acquired metadata and necessary to send the driver, on the first information storage unit 1715.

Note here that in the following description, the information indicating the attribute of the device 2000 is simply referred to as "device attribute information" where necessary. Here, it is supposed that the device 2000 of the device number "Dev-1" including the print function has been extracted and that the device attribute information is acquired having the following contents according to the acquired metadata:

Media access control (MAC) address:
AA-BB-CC-DD-EE-01
UPnP ID: UPnP_4E0F
IP address: aaa.bbb.ccc.101
Color printing: COLOR
Printing speed: 40
Finishing function: None.

Here, the color printing "COLOR" indicates that the extracted device 2000 includes the color print function.

Furthermore, the printing speed "40" indicates that the printing speed of the extracted device 2000 is 40 ppm. In addition, the finishing function "None" indicates that the extracted device 2000 includes only a normal discharge port function and includes no finishing function.

FIG. 23 illustrates an example of a table for storing the device attribute information on the first information storage unit 1715 according to the present exemplary embodiment.

Referring to FIG. 23, in a table 230, various information about the UPnP device 2000 associated with one another is registered. The information stored in the table 230 includes the MAC address, the UPnP ID, the IP address, information about whether the color printing is available, the printing speed, and the finishing function. Note that the MAC address is used to identify devices of the same type.

Furthermore, the UPnP ID refers to an ID for UPnP described in an INF description in the driver. That is, if the UPnP ID is recognized, it can be determined whether the driver is compliant with the device 2000 by referring to the content of the INF description in the driver.

In step S307, the first device management control unit 1712 notifies the first driver management control unit 1714 that the UPnP device 2000 has been extracted and the device attribute information has been stored on the first information storage unit 1715. With respect to the notification, a communication method such as the web service can be used.

Here, it is also useful if the first driver management control unit 1714 periodically monitors whether the device attribute information has been described in a file or stored in the database instead of performing the above-described notification. The details of the UPnP device management processing in step S2 in FIG. 4 are as described above in steps S305 through S307.

Now, the processing for automatically associating the UPnP device with the driver in step S3 in FIG. 4 will be described in detail below.

In step S308, the first driver management control unit 1714 accesses the first information storage unit 1715 and determines whether the device attribute information for identifying the driver exists.

If it is determined in step S308 that the device attribute information for identifying the driver does not exist (NO in step S308), then the processing in the flow charts of FIGS. 22A through 22C ends. On the other hand, if it is determined in step S308 that the device attribute information for identifying the driver exists (YES in step S308), then the processing advances to step S309.

Here, it is supposed that the UPnP ID "UPnP_4E0F" has been acquired as the UPnP ID in the device attribute information stored in step S306 (see FIG. 23).

In step S309, the first driver management control unit 1714 accesses the first driver storage unit 1716 and determines whether a driver that matches the UPnP ID that has been acquired in step S306 exists.

If it is determined in step S309 that no driver that matches the UPnP ID that has been acquired in step S306 exists (NO in step S309), then the processing in the flow charts of FIGS. 22A through 22C ends.

On the other hand, if it is determined in step S309 that a driver that matches the UPnP ID that has been acquired in step S306 exists (YES in step S309), then the processing advances to step S310.

FIG. 24 illustrates an example of a table for storing the driver information on the first driver storage unit 1716 according to the present exemplary embodiment. Referring to FIG. 24, in a table 240, the driver ID and the UPnP ID associated with each other are registered.

In the above-described example, in step S309, the first driver management control unit 1714 determines that the "DRIVER00" is the driver that is determined to match the UPnP ID in step S309 (see FIG. 23 and FIG. 24).

In this case, the device 2000 whose device number is "Dev-1" and whose UPnP ID is "UPnP_4E0F" is associated with the driver whose driver ID is "DRIVER00" (see FIG. 23 and FIG. 24).

In this regard, in step S310, the first driver management control unit 1714 associates the device 2000 whose device number is "Dev-1" with the driver whose driver ID is "DRIVER00" and stores information indicating the mutually associated device 2000 and driver in the first information storage unit 1715.

FIG. 25 illustrates an example of a table for storing the device 2000 and the driver associated with each other on the first information storage unit 1715 according to the present exemplary embodiment. In the example illustrated in FIG. 25, in a table 250, the association ID, the device number, and the driver ID, which are associated with one another, are registered.

More specifically, in the table 250 illustrated in FIG. 25, the device number "Dev-1" and the driver ID "DRIVER00" are associated with the association ID "Connect-01". As described above, in the present exemplary embodiment, an exemplary association unit is implemented by performing at least the processing in step S310.

The details of the processing for automatically associating the UPnP device with the driver in step S3 in FIG. 4 are as described above in steps S308 through S310.

Now, the driver sending client information acquisition processing in step S4 in FIG. 4 will be described in detail below. Before advancing to step S311, the first driver management control unit 1714 accesses the table 110 stored on the first information storage unit 1715 (see FIG. 10).

In step S311, the first driver management control unit 1714 determines whether a device attribute ID that matches the device attribute information registered in the table 230 (FIG. 23) exists and whether a selected client ID associated with the device attribute ID exists.

If it is determined in step S311 that no device attribute ID that matches the device attribute information registered in the table 230 (FIG. 23) exists and no selected client ID associated with the device attribute ID exists (NO in step S311), then the processing in the flow chart in FIGS. 22A through 22C ends.

On the other hand, if it is determined in step S311 that a device attribute ID that matches the device attribute information registered in the table 230 (FIG. 23) exists and a selected client ID associated with the device attribute ID exists (YES in step S311), then the processing advances to step S312. In the above-described example, the device attribute information registered in the table 230 matches the device attribute ID "SelectedDevAttr-1" having the content described in the tables 111 through 113 illustrated in FIGS. 11 through 13.

In step S312, the first driver management control unit 1714 accesses the table 115 illustrated in FIG. 15 and extracts the selected client ID associated with the device attribute ID that has been determined to match the device attribute information registered in the table 230.

In the above-described example, the selected client ID "SelectedClients-1" that is associated with the device attribute ID "SelectedDevAttr-1", which has been determined to match the device attribute information registered in the table 230 in step S311, is extracted.

In step S313, the first driver management control unit 1714 accesses the table 114 illustrated in FIG. 14 and extracts the selected client associated with the selected client ID extracted in step S312. In the above-described example, it is detected that the clients "CLIENT00" and "CLIENT02" are driver sending destination clients according to the selected client ID "SelectedClients-1".

The details of the driver sending client information acquisition processing in step S4 in FIG. 4 are as described above in steps S311 through S313.

Now, operation environment mode information acquisition processing in step S5 in FIG. 4 will be described in detail below with reference to FIG. 22A. Before advancing to step S400 in FIG. 22B, the first driver management control unit 1714 accesses the table 210 illustrated in FIG. 21 and acquires a value of the operation environment mode. In step S314 in FIG. 22A, the first driver management control unit 1714 determines which operation environment mode has been set.

If it is determined as a result of the determination in step S314 that the "PUSH (agent-installed) mode" has been set as the operation environment mode, then the processing advances to step S400 in FIG. 22B. If it is determined as a result of the determination in step S314 that the "print server mode" has been set as the operation environment mode, then the processing advances to step S500 in FIG. 22C. If it is determined as a result of the determination in step S314 that neither the "PUSH (agent-installed) mode" nor the "print server mode" has been set as the operation environment mode, then the processing in the flow charts of FIGS. 22A through 22C ends.

As described above, in the present exemplary embodiment, an exemplary determination unit is implemented by performing at least the processing in step S314. In addition, in the present exemplary embodiment, an exemplary first mode is implemented by the "PUSH (agent-installed) mode". Furthermore, an exemplary second mode is implemented by the "print server mode".

Now, the driver installation processing in step S6 illustrated in FIG. 4 will be described in detail below with reference to FIG. 22B. To begin with, the driver installation processing performed when the "PUSH (agent-installed) mode" is set as the operation environment mode will be described below.

Referring to FIG. 22B, in step S400, the first driver management control unit 1714 generates an immediate performing task (driver sending task). Here, the immediate performing task (the driver sending task) includes information about the selected client and the driver ID and information about the IP address of the device having the corresponding device number. In the above-described example, the first driver management control unit 1714 generates an immediate performing task constituted by the information about the selected clients "CLIENT00" and "CLIENT02", the driver ID "DRIVER00", and the device number "Dev-1".

In step S401, the first driver management control unit 1714 registers the generated immediate performing task on the first task management control unit 1713. In step S402, because the task registered thereon is the immediate performing task, the first task management control unit 1713 notifies the registered task to the first driver management control unit 1714. After receiving the task from the first task management control unit 1713, the first driver management control unit 1714 performs the received immediate performing task.

In the above-described example, the first driver management control unit 1714 issues an instruction for performing the driver installation processing to the fourth service program unit 4710 of each of the driver sending clients 4000 corresponding to the selected clients "CLIENT00" and "CLIENT02". As described above, in the present exemplary embodiment, an exemplary installation unit is implemented by performing at least the processing in step S402.

In step S403, the fourth service program unit 4710 acquires the driver ID and the IP address information designated in the task and performs the driver installation processing. More specifically, in the above-described example, the fourth service program unit 4710 acquires the driver ID "DRIVER00" and the IP address information about the device of the device number "Dev-1" and then performs the driver installation processing.

In step S404, the fourth service program unit 4710 notifies a result of the driver installation processing to the first driver management control unit 1714. After receiving the result of the driver installation processing, the first driver management control unit 1714 notifies the received result of the driver installation processing to the first task management control unit 1713.

In step S405, the first task management control unit 1713 accesses the first information storage unit 1715 and stores the result of the driver installation processing on the first information storage unit 1715.

Here, the administrator can access the management server 1000 from the third input unit 3200 and the third display unit 3100 of the administrator client 3000 to verify the result of the driver installation processing stored in step S405. Thus, the administrator can recognize and verify the result of installing the driver by referring to the predetermined corresponding UI screen.

Now, processing performed if it is determined as a result of the determination in step S314 that the "print server mode" has been set as the operation environment mode will be described in detail below with reference to FIG. 22C. Here, in the present exemplary embodiment, it is supposed that the "print server mode" has been set as the operation environment mode, in which case the administrator has selected the "print server mode" via the UI screen 200 (FIG. 20) in step S210 (FIG. 19) and the selected parameter has been stored in the table 210 (FIG. 21).

Referring to FIG. 22C, in step S500, the first driver management control unit 1714 generates an immediate performing task. Here, the immediate performing task includes the driver ID, which has been determined by performing the processing up to step S314 and the information about the IP address of the device having the corresponding device number. More specifically, in the above-described example, the first driver management control unit 1714 generates an immediate performing task constituted by the driver ID "DRIVER00" and the IP address information about the device whose device number is "Dev-1".

In step S501, the first driver management control unit 1714 registers the generated immediate performing task on the first task management control unit 1713. In step S502, because the task registered thereon is the immediate performing task, the first task management control unit 1713 notifies the registered task to the first driver management control unit 1714. After receiving the task from the first task management control unit 1713, the first driver management control unit 1714 performs the received immediate performing task.

More specifically, the first driver management control unit 1714 communicates with the fifth service program unit 5710 of the print server 5000 by using the web service to prompt the fifth service program unit 5710 to perform the driver installation processing. As described above, in the present exemplary embodiment, an installation unit is implemented by performing at least the processing in step S502.

In step S503, the fifth service program unit 5710 acquires the driver ID and the IP address information designated in the task and performs the driver installation processing. More specifically, in the above-described example, the fifth service program unit 5710 acquires the driver ID "DRIVER00" and the IP address information about the device having the device number "Dev-1" and performs the driver installation processing.

During the driver installation processing, the fifth service program unit 5710 performs processing for setting the sharing of the installed driver so that the driver sending client 4000 (the "CLIENT00" and the "CLIENT02") can use the installed driver by the point and printing.

In step S504, the fifth service program unit 5710 notifies a result of the driver installation processing to the first driver management control unit 1714. After receiving the result of the driver installation processing, the first driver management control unit 1714 notifies the received result of the driver installation processing to the first task management control unit 1713.

In step S505, the first task management control unit 1713 accesses the first information storage unit 1715 and stores the result of the driver installation processing on the first information storage unit 1715.

Here, the administrator can access the management server 1000 from the third input unit 3200 and the third display unit 3100 of the administrator client 3000 to verify the result of the driver installation processing stored in step S505. Thus, the administrator can recognize and verify the result of installing the driver by referring to the predetermined corresponding UI screen.

In step S506, the first driver management control unit 1714 determines whether the processing for installing the driver on the print server 5000 in step S505 has been successfully completed. If it is determined in step S506 that the processing for installing the driver on the print server 5000 in step S505 has not been successfully completed (NO in step S506), then the processing in FIGS. 22A through 22C ends. On the other hand, if it is determined in step S506 that the processing for installing the driver on the print server 5000 in step S505 has been successfully completed (YES in step S506), then the processing advances to step S507.

In step S507, the first driver management control unit 1714 issues an instruction for using the print server 5000 to the fourth service program unit 4710 of the driver sending client 4000, which corresponds to the selected client. In the above-described example, the first driver management control unit 1714 issues an instruction for using the print server 5000 to the fourth service program unit 4710, which corresponds to the selected clients "CLIENT00" and "CLIENT02", via the web service. The instruction issued by the first driver management control unit 1714 here includes a shared device name of the print server 5000 and information for identifying the location of the print server 5000 such as the IP address.

In step S508, the fourth service program unit 4710 acquires driver information about the already installed driver. In step S509, the fourth service program unit 4710 determines whether the driver that is similar to that for a shared printer connected to the print server 5000, whose use has been instructed in step S507, is already used by the peer to peer connection (the LPR connection).

If it is determined in step S509 that the driver that is similar to that for a shared printer connected to the print server 5000 is already used by the peer to peer connection (YES in step S509), then the processing advances to step S510. On the other hand, if it is determined in step S509 that the driver that is similar to that for a shared printer connected to the print server 5000, whose use has been instructed in step S507, is not used by the peer to peer connection yet (NO in step S509), then the processing skips the processing in step S510 and advances to step S511.

In step S510, the fourth service program unit 4710 deletes information about the printer and the LPR port corresponding to the device 2000 that has been connected by the peer to peer connection to discontinue the peer to peer connection. In the above-described example, the fourth service program unit 4710 deletes the information about the printer and the LPR port information corresponding to the device 2000 whose device number is "Dev-1".

In step S511, the fourth service program unit 4710 determines whether the point and printing from the print server 5000 to the device 2000 can be automatically set as a silent setting. In the above-described example, the fourth service program unit 4710 determines whether the point and printing from the print server 5000 to the device 2000 whose device number is "Dev-1" can be automatically set. Here, whether the point and printing can be set is determined based on the capacity of an operating system (OS) of the driver sending client 4000.

If it is determined in step S511 that the point and printing from the print server 5000 to the device 2000 whose device number is "Dev-1" can be automatically set (YES in step S511), then the processing advances to step S512. On the other hand, if it is determined in step S511 that the point and printing from the print server 5000 to the device 2000 whose device number is "Dev-1" cannot be automatically set (NO in step S511), then the processing advances to step S513.

In step S512, the fourth service program unit 4710 performs the setting for the point and printing automatically. In step S513, the fourth service program unit 4710 displays various information as a message in a message box or as a balloon message in the fourth display unit 4100 of the driver sending client 4000.

The message displayed in the message box and the balloon message include information about a hyper link to the device 2000 whose device number is "Dev-1" and which is connected to the print server 5000. Furthermore, the message displayed in the message box and the balloon message prompt the user of the driver sending client 4000 to manually perform the point and printing. Then, the fourth service program unit 4710 sets the point and printing according to the user operation.

In step S514, the fourth service program unit 4710 notifies a result of the driver installation processing to the first driver management control unit 1714. In this regard, in the case where the user has manually performed the setting for the point and printing in step S513, the first driver management control unit 1714 determines that the driver has been successfully installed when the message in the message box or the balloon message that prompt the user to perform the setting for the point and printing is displayed.

Then, the fourth service program unit 4710 notifies a result of the driver installation processing to the first task management control unit 1713. In step S515, the first task management control unit 1713 accesses the first information storage unit 1715 and stores the result of the driver installation processing on the first information storage unit 1715. Then, the processing in the flow charts of FIGS. 22A through 22C ends.

Here, the administrator can access the management server 1000 from the third input unit 3200 and the third display unit 3100 of the administrator client 3000 to verify the result of the driver installation processing stored in step S405. Thus, the administrator can recognize and verify the result of installing the driver by referring to the predetermined corresponding UI screen.

Here, the administrator can access the management server 1000 from the third input unit 3200 and the third display unit 3100 of the administrator client 3000 to verify the result of the driver installation processing stored in step S515. Thus, the administrator can recognize and verify the result of installing the driver by referring to the predetermined corresponding UI screen.

As described above, in the present exemplary embodiment, when the device 2000 is connected to (enters) the network (the communication line 6000), the device 2000 sends the network entry message (the Hello message) to the management server 1000 by unicast according to the UPnP protocol.

The management server 1000 sends a reply to the network entry message, acquires the device metadata, and associates the device attribute information included in the device metadata with the driver corresponding to the device attribute information. In addition, the management server 1000 extracts the driver sending client 4000 that has been previously associated with the device attribute information included in the device metadata.

Then, the management server 1000 determines the type of the operation environment mode that has been set by the administrator and installs the driver according to the operation environment mode extracted as a result of the determination.

More specifically, if the PUSH mode has been set by the administrator as the operation environment mode, then the management server 1000 installs the driver directly on the driver sending client 4000. On the other hand, if the print server mode has been set by the administrator as the operation environment mode, then the management server 1000 installs the driver for the driver sending client 4000 on the print server 5000 so that the driver can be used by the point and printing.

Accordingly, the management server 1000 can centrally manage the installed drivers regardless of the type of the operation environment mode set (i.e., regardless of whether the PUSH mode or the print server mode has been set) by the administrator.

Furthermore, according to the present exemplary embodiment, an appropriate driver can be installed on the driver sending client 4000 according to the driver attribute of the device 2000, in the format compliant with the operation environment mode of the printing system.

According to the present exemplary embodiment having the above-described configuration, usability can be improved and the installed device driver can be easily and appropriately managed. Furthermore, according to the present exemplary embodiment, management costs can be effectively reduced. In addition, according to the present exemplary embodiment, business operations can be performed with a high efficiency and thus the total cost of ownership (TCO) can also be effectively reduced.

A second exemplary embodiment of the present invention will now be described below. In the above-described first exemplary embodiment, the operation environment mode is set for the entire printing system (see FIGS. 19 and 20). In this regard, in the present exemplary embodiment, the operation environment mode is differently and separately set with respect to each driver sending client 4000.

That is, the present exemplary embodiment is primarily different from the first exemplary embodiment with respect to a part of the method for setting the operation environment mode. In this regard, the units, components, and steps similar to those in the first exemplary embodiment are provided with the same numerals and symbols. Accordingly, the detailed description thereof is not repeated here.

Figure 26:
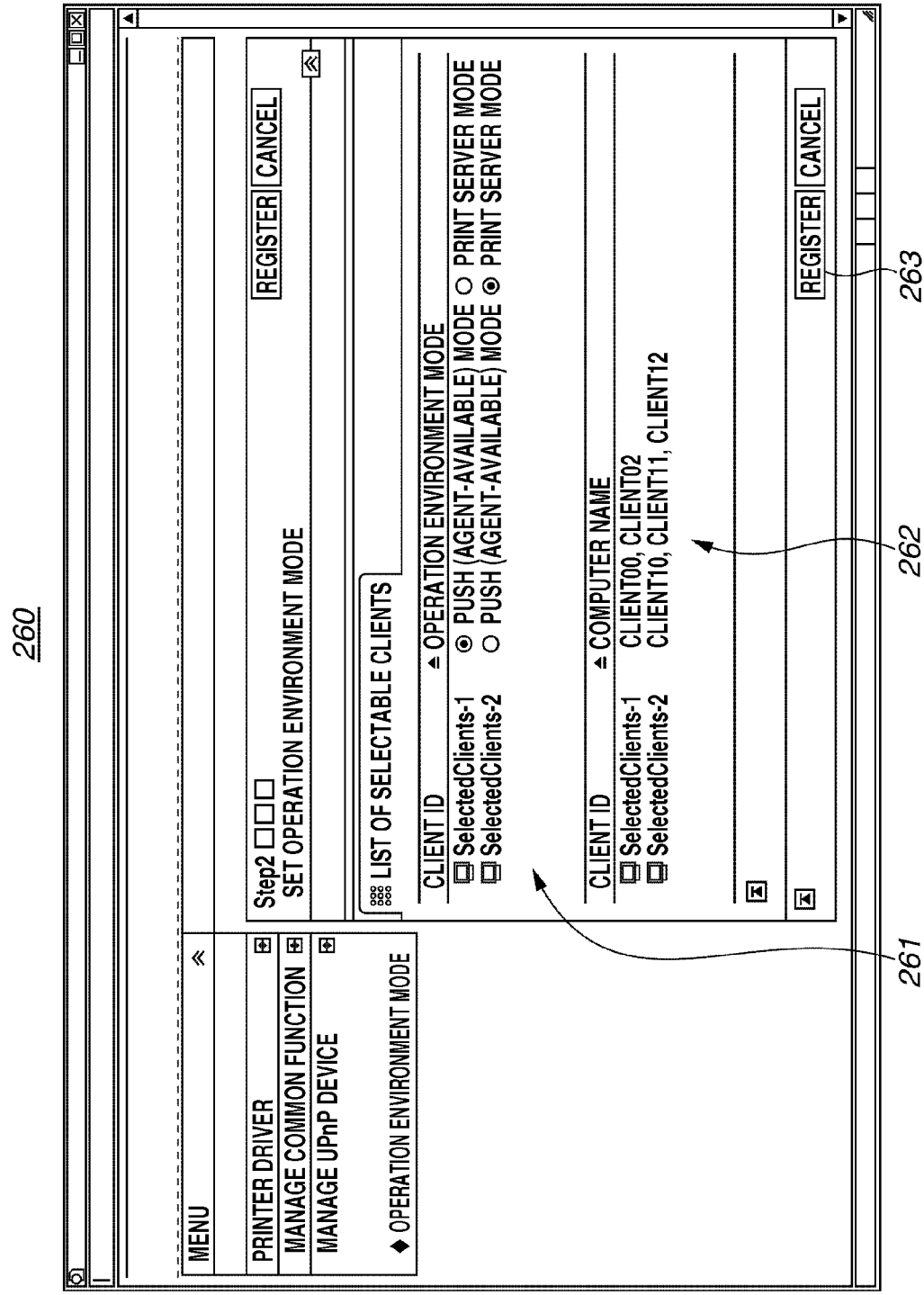
FIG. 26 illustrates an example of a UI screen displayed when an operation environment mode item is selected from a menu according to a second exemplary embodiment of the present invention.

FIG. 26 illustrates an example of a UI screen displayed when an operation environment mode item is selected from the menu according to present exemplary embodiment. Referring to FIG. 26, in the present exemplary embodiment, a UI screen 260 is used in step S210 in the flow chart of FIG. 19, which is described above in the first exemplary embodiment.

In an upper right field 261 in the UI screen 260, the operation environment mode is set with respect to each selected client ID, which indicates the driver sending client 4000 that has been associated with the device 2000 by performing the processing in the flow chart of FIG. 5 described above in the first exemplary embodiment (see FIG. 14). Furthermore, in a lower right field 262 in the UI screen 260, detailed information about the ID for each selected client is listed.

More specifically, in the example illustrated in FIG. 26, the "PUSH (agent-installed) mode" has been selected and designated as the operation environment mode for the selected client ID "SelectedClients-1". Furthermore, with respect to a selected client ID "SelectedClients-2", the "print server mode" has been selected and designated as the operation environment mode.

When the administrator presses a "register" button 263 via the UI screen 260, the first driver management control unit 1714 inputs information about the operation environment mode that has been selected by the administrator via the UI screen 260 and stores the input information about the operation environment mode set by the administrator on the first information storage unit 1715.

FIG. 27 illustrates an example of a table for storing information about the operation environment mode on the first information storage unit 1715 according to the present exemplary embodiment.

Referring to FIG. 27, a table 270 mutually associates the selected client ID "SelectedClients-1" and the operation environment mode "PUSH (agent-installed) mode". In addition, the selected client ID "SelectedClients-2" and the operation environment mode "print server mode" are mutually associated.

When the device 2000 is extracted in the above-described state, the selected client ID that has been associated with the device attribute information is also extracted. Then, the processing in step S314 and subsequent steps in FIG. 22A is performed according to the operation environment mode associated with the selected client ID.

As described above, in the present exemplary embodiment, a setting unit that previously sets the operation environment mode with respect to each driver sending client 4000 is implemented by using at least the UI screen 260 illustrated in FIG. 26.

As described above, the present exemplary embodiment sets the operation environment mode differently and separately with respect to each driver sending client 4000. Accordingly, the present exemplary embodiment can flexibly and appropriately set the operation environment mode as well as implement the function of the first exemplary embodiment.

In the present exemplary embodiment, the operation environment mode is differently and separately set with respect to each and every one of the driver sending clients 4000. However, the present exemplary embodiment is not limited to this. That is, it is also useful if the operation environment mode is set differently and separately with respect to each group including a plurality of driver sending clients 4000, for example.

In this case, the operation environment mode is set with respect to each group of driver sending clients 4000.

Each of the units that constitute the driver management apparatus and the client terminal apparatus and each step in the driver management method according to the exemplary embodiment of the present invention can be implemented by executing the program stored on a random access memory (RAM) or a read-only memory (ROM) of a computer. The program and a computer-readable recording medium (storage medium) storing the program are included in the present invention.

The present invention can be implemented in a system, an apparatus, a method, a program, or a storage medium storing the program, for example. More specifically, the present invention can be applied to a system including a plurality of devices and to an apparatus that includes a single device.

The present invention can be implemented by directly or remotely supplying a program of software implementing functions of the above-described exemplary embodiments (in the exemplary embodiments, the program corresponding to the processing performed according to the flow charts in FIGS. 4, 5, 19, and 22A through 22C) to a system or an apparatus and reading and executing the supplied program code with a computer of the system or the apparatus.

Accordingly, the program code itself, which is installed on the computer for implementing the functional processing of an exemplary embodiment of the present invention with the computer, implements the present invention. That is, the present invention also includes a computer program implementing the functional processing of an exemplary embodiment of the present invention.

Accordingly, the program can be configured in any form, such as object code, a program executed by an interpreter, and script data supplied to an OS.

As the recording medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a digital versatile disc (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different websites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to an exemplary embodiment of the present invention after an encryption thereof, by allowing the user who is qualified for a prescribed condition to download key information for decoding the encryption from the web site via the Internet, and by executing and installing on the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

According to an exemplary embodiment of the present invention, when a network entry message is sent by unicast from the device connected to the network according to the search protocol for one-to-one connection, the driver for operating the device is installed.

Accordingly, the present exemplary embodiment can manage the network entry message with a specific apparatus. Therefore, the present exemplary embodiment can manage the driver for executing a job output from the client terminal apparatus with a specific apparatus.

In addition, according to an exemplary embodiment of the present invention, the driver is installed on the client terminal apparatus connected to the network according to the operation environment in executing a job sent from the network-connected client terminal apparatus with the device connected to the network. Accordingly, the exemplary embodiments of the present invention can install the driver for executing the job in the format compliant with the operation environment for executing the job sent from the client terminal apparatus connected to the network with the network-connected device.

According to an exemplary embodiment of the present invention having the above-described configuration, the driver for executing a job can be appropriately managed compared to conventional methods.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-319838 filed Dec. 11, 2007, which is hereby incorporated by reference herein in its entirety.

What is claimed is:

1. A driver management apparatus comprising:
   a receiving unit configured to receive a network entry message sent by unicast according to a search protocol for one-to-one connection from a device connected to a network;
   a determination unit configured to determine an operation environment in which the device executes a job sent from a client apparatus connected to the network; and
   an installation unit configured to install a driver for operating the device that has sent the network entry message,
   wherein, if the operation environment determined by the determination unit is an environment in which the client apparatus directly instructs the device to execute the job, the installation unit is configured to install all of the driver on the client apparatus to enable the client apparatus to directly instruct the device to execute the job,
   and if the operation environment determined by the determination unit is an environment in which the client apparatus instructs the device via a print server connected to the device to execute the job, the installation unit is configured to install a part of the driver on the print server to enable the client apparatus to instruct the device via the print server to execute the job.

2. The driver management apparatus according to claim 1, further comprising:
   a second receiving unit configured to receive, from the device that has sent the network entry message, device attribute information that indicates an attribute of the device; and
   a registration unit configured to associate the device attribute information that indicates the attribute of the device with at least one of the client apparatus and the print server, and to register the associated device attribute information and the client apparatus or the print server on a storage medium,
   wherein the installation unit is configured to install the driver on the client apparatus or the print server registered by the registration unit in association with the device attribute information received by the second receiving unit.

3. The driver management apparatus according to claim 2, further comprising an association unit configured to associate the device that has sent the network entry message with a driver that corresponds to the device attribute information that indicates the attribute of the device.

4. The driver management apparatus according to claim 1, further comprising a setting unit configured to set the operation environment according to an operation by a user, wherein the determination unit is configured to determine the operation environment in which the device executes a job sent from a client apparatus connected to the network based on a content of the operation environment set by the setting unit.

5. The driver management apparatus according to claim 4, wherein the setting unit is configured to set the operation environment with respect to each client apparatus or each group including a plurality of client apparatuses according to an operation by the user.

6. A method for driver management, the method comprising:
determining an operation environment in which a device connected to a network executes a job sent from a client apparatus connected to the network;
installing a driver for operating the device that has sent the network entry message, when a network entry message sent from the device according to a search protocol for one-to-one connection is received, wherein
if the determined operation environment is an environment in which the client apparatus directly instructs the device to execute the job, installing all of the driver on the client apparatus to enable the client apparatus to directly instruct the device to execute the job, and
if the operation environment is an environment in which the client apparatus instructs the device via a print server connected to the device to execute the job, installing a part of the driver on the print server to enable the client apparatus to instruct the device via the print server to execute the job.

7. The method according to claim 6, further comprising:
registering, on a storage medium, device attribute information that indicates an attribute of the device and at least one of the client apparatus and the print server in association with each other; and
installing the driver on the client apparatus or the print server registered in association with the received device attribute information, when the device attribute information that indicates the attribute of the device is received from the device that has sent the network entry message.

8. The method according to claim 7, further comprising associating the device that has sent the network entry message with a driver that corresponds to the device attribute information that indicates the attribute of the device.

9. The method according to claim 6, further comprising:
setting the operation environment according to an operation by a user; and
determining the operation environment in which the device executes a job sent from a client apparatus connected to the network based on a content of the set operation environment.

10. The method according to claim 9, further comprising setting the operation environment with respect to each client apparatus or each group including a plurality of client apparatuses according to an operation by the user.

11. A non-transitory computer-readable storage medium storing instructions which, when executed by an apparatus, cause the apparatus to perform a method comprising:
determining an operation environment in which a device connected to a network executes a job sent from a client apparatus connected to the network;
installing a driver for operating the device that has sent the network entry message, when a network entry message sent from the device according to a search protocol for one-to-one connection is received, wherein
if the determined operation environment is an environment in which the client apparatus directly instructs the device to execute the job, installing all of the driver on the client apparatus to enable the client apparatus to directly instruct the device to execute the job, and
if the operation environment is an environment in which the client apparatus instructs the device via a print server connected to the device to execute the job, installing a part of the driver on the print server to enable the client apparatus to instruct the device via the print server to execute the job.

12. A driver management apparatus comprising:
a setting unit configured to set, according to an operation by a user, an operation environment in which the device executes a job sent from a client apparatus connected to the network;
a receiving unit configured to receive a network entry message sent by unicast according to a search protocol for one-to-one connection from a device connected to a network;
a determination unit configured to determine the operation environment; and
an installation unit configured to install a driver for operating the device that has sent the network entry message,
wherein, if the operation environment determined by the determination unit is an environment in which the client apparatus directly instructs the device to execute the job, the installation unit is configured to install the driver to enable the client apparatus to directly instruct the device to execute the job,
and if the operation environment determined by the determination unit is an environment in which the client apparatus instructs the device via a print server connected to the device to execute the job, the installation unit is configured to install the driver to enable the client apparatus to instruct the device via the print server to execute the job.

13. The driver management apparatus according to claim 12, wherein the setting unit is configured to set the operation environment with respect to each client apparatus or each group including a plurality of client apparatuses according to an operation by the user.

14. A method for driver management, the method comprising:
setting, according to an operation by a user, an operation environment in which the device executes a job sent from a client apparatus connected to the network;
receiving a network entry message sent by unicast according to a search protocol for one-to-one connection from a device connected to a network;
determining the operation environment; and
installing a driver for operating the device that has sent the network entry message,
wherein, if the operation environment is determined to be an environment in which the client apparatus directly instructs the device to execute the job, the driver is installed to enable the client apparatus to directly instruct the device to execute the job, and
if the operation environment is determined to be an environment in which the client apparatus instructs the device via a print server connected to the device to execute the job, the driver is installed to enable the client apparatus to instruct the device via the print server to execute the job.

15. The method according to claim 14, further comprising setting the operation environment with respect to each client apparatus or each group including a plurality of client apparatuses according to an operation by the user.

16. A non-transitory computer-readable storage medium storing instructions which, when executed by an apparatus, cause the apparatus to perform a method comprising:
- setting, according to an operation by a user, an operation environment in which the device executes a job sent from a client apparatus connected to the network;
- receiving a network entry message sent by unicast according to a search protocol for one-to-one connection from a device connected to a network;
- determining the operation environment; and
- installing a driver for operating the device that has sent the network entry message,
- wherein, if the operation environment is determined to be an environment in which the client apparatus directly instructs the device to execute the job, the driver is installed to enable the client apparatus to directly instruct the device to execute the job, and
- if the operation environment is determined to be an environment in which the client apparatus instructs the device via a print server connected to the device to execute the job, the driver is installed to enable the client apparatus to instruct the device via the print server to execute the job.

17. The non-transitory computer-readable storage medium according to claim 16, further comprising setting the operation environment with respect to each client apparatus or each group including a plurality of client apparatuses according to an operation by the user.

* * * * *